(12) United States Patent
Mori et al.

(10) Patent No.: US 7,613,878 B2
(45) Date of Patent: Nov. 3, 2009

(54) MANAGEMENT OF NUMBER OF DISK GROUPS THAT CAN BE ACTIVATED IN STORAGE DEVICE

(75) Inventors: Hajime Mori, Yokohama (JP); Takashi Amano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 11/319,257

(22) Filed: Dec. 27, 2005

(65) Prior Publication Data

US 2007/0106843 A1    May 10, 2007

(30) Foreign Application Priority Data

Nov. 8, 2005    (JP)    ............... 2005-323416

(51) Int. Cl.
*G06F 12/00*    (2006.01)
(52) U.S. Cl. ...................................... 711/114
(58) Field of Classification Search ............... None
See application file for complete search history.

(56) References Cited

U.S. PATENT DOCUMENTS

| 5,423,046 A | 6/1995 | Nunnelley et al. | |
| 5,430,855 A * | 7/1995 | Walsh et al. | 710/10 |
| 2003/0221077 A1 | 11/2003 | Ohno et al. | |
| 2005/0235107 A1 | 10/2005 | Ohno et al. | |
| 2006/0069886 A1 * | 3/2006 | Tulyani | 711/161 |
| 2006/0179219 A1 * | 8/2006 | Daikokuya et al. | 711/114 |
| 2009/0049241 A1 | 2/2009 | Ohno et al. | |

FOREIGN PATENT DOCUMENTS

EP    01357476 A    10/2003

OTHER PUBLICATIONS

European Patent Office (EPO) Search Report for patent application EP06252331 (Jun. 4, 2009).

* cited by examiner

*Primary Examiner*—Matt Kim
*Assistant Examiner*—Ryan Dare
(74) *Attorney, Agent, or Firm*—Townsend and Townsend and Crew LLP

(57) ABSTRACT

To provide a technique by which, if the number of active disk groups in a storage device is restricted, an appropriate logical volume in the storage device can be used. A management apparatus manages a storage device provided externally. The management apparatus obtains management data indicating which of a plurality of disk groups included in the storage device is active, from the storage device. In addition, the management apparatus executes predetermined processing with reference to the management data in order to utilize a logical volume belonging to a disk group in the storage device while ensuring that the number of active disk groups in the storage device does not exceed an upper limit value.

19 Claims, 24 Drawing Sheets

SYSTEM RAID GROUP MANAGEMENT TABLE

| | NUMBER OF ACTIVE RAID GROUPS | ACTIVE RAID GROUP NUMBER (#) | UPPER LIMIT VALUE |
|---|---|---|---|
| STORAGE DEVICE A | 2 | 01, 02 | 2 |
| STORAGE DEVICE B | 0 | — | 1 |

Fig.3

RAID GROUP MANAGEMENT TABLE

| NUMBER OF ACTIVE RAID GROUPS | ACTIVE RAID GROUP NUMBER (#) | UPPER LIMIT VALUE |
|---|---|---|
| 2 | 01, 02 | 2 |

Fig.4

SYSTEM CONFIGURATION MANAGEMENT TABLE

| DEVICE NAME | MODEL | LU_ID | RAID GROUP NUMBER (#) (RAID LEVEL) | SIZE | USED SIZE |
|---|---|---|---|---|---|
| STORAGE DEVICE A | AMS | 01 | 01 (RAID5) | 50G | 50G |
| STORAGE DEVICE A | AMS | 02 | 02 (RAID5) | 50G | 2G |
| STORAGE DEVICE A | AMS | UNASSIGNED | 02 (RAID5) | 80G | — |
| STORAGE DEVICE A | AMS | UNASSIGNED | 03 (RAID5) | 50G | — |
| STORAGE DEVICE B | AMS | UNASSIGNED | 01 (RAID5) | 20G | — |
| STORAGE DEVICE B | AMS | UNASSIGNED | 02 (RAID5) | 30G | — |

Fig.5

VIRTUALIZATION MANAGEMENT TABLE

| VIRTUAL VOLUME ID | VIRTUAL VOLUME SIZE | REAL VOLUME (DEVICE NAME : LU_ID) | REAL VOLUME SIZE | USED SIZE |
|---|---|---|---|---|
| 001 | 1T | STORAGE DEVICE A:01 | 50G | 50G |
|  |  | STORAGE DEVICE A:02 | 50G | 2G |

Fig.6

AOU MANAGEMENT TABLE

| VIRTUAL VOLUME ID | VIRTUAL VOLUME SIZE | UTILIZATION RATE THRESHOLD | ADDITIONAL REAL VOLUME CONDITIONS |
|---|---|---|---|
| 001 | 1T | 90% | 50G(RAID5) |

Fig.7

SYSTEM RAID GROUP MANAGEMENT TABLE

|  | NUMBER OF ACTIVE RAID GROUPS | ACTIVE RAID GROUP NUMBER (#) | UPPER LIMIT VALUE |
|---|---|---|---|
| STORAGE DEVICE A | 2 | 01, 02 | 2 |
| STORAGE DEVICE B | 0 | — | 1 |

Fig.12

CANDIDATE MANAGEMENT TABLE

| CANDIDATE NUMBER | DEVICE NAME | RAID GROUP NUMBER (#) | FLAG |
|---|---|---|---|
| 1 | STORAGE DEVICE A | 02 | — |
| 2 | STORAGE DEVICE A | 03 | — |
| 3 | STORAGE DEVICE B | 01, 02 | — |
| 4 | STORAGE DEVICE A | 02, 03 | — |
| 5 | STORAGE DEVICE A | 02 | — |
| | STORAGE DEVICE B | 01 | |

Fig.13

CANDIDATE MANAGEMENT TABLE

| CANDIDATE NUMBER | DEVICE NAME | RAID GROUP NUMBER (#) | FLAG |
|---|---|---|---|
| 1 | STORAGE DEVICE A | 02 | 1 |
| 2 | STORAGE DEVICE A | 03 | 0 |
| 3 | STORAGE DEVICE B | 01, 02 | 1 |
| 4 | STORAGE DEVICE A | 02, 03 | 0 |
| 5 | STORAGE DEVICE A | 02 | 1 |
| | STORAGE DEVICE B | 01 | |

Fig.16

SYSTEM CONFIGURATION MANAGEMENT TABLE

| DEVICE NAME | MODEL | LU_ID | RAID GROUP NUMBER (#) (RAID LEVEL) | SIZE | USED SIZE |
|---|---|---|---|---|---|
| STORAGE DEVICE A | AMS | 01 | 01 (RAID5) | 50G | 50G |
| STORAGE DEVICE A | AMS | 02 | 02 (RAID5) | 50G | 2G |
| STORAGE DEVICE A | AMS | 03 | 02 (RAID5) | 80G | 10G |
| STORAGE DEVICE A | AMS | 04 | 03 (RAID5) | 50G | 20G |
| STORAGE DEVICE B | AMS | 01 | 01 (RAID5) | 20G | 5G |
| STORAGE DEVICE B | AMS | 02 | 02 (RAID5) | 60G | 10G |

Fig.17

EXTERNAL VOLUME MAPPING TABLE

| ADVANCED STORAGE DEVICE | | OTHER STORAGE DEVICE | |
|---|---|---|---|
| DEVICE NAME | VIRTUAL VOLUME ID | DEVICE NAME | LU_ID |
| STORAGE DEVICE S | 001 | STORAGE DEVICE A | 01 |
| STORAGE DEVICE S | 002 | STORAGE DEVICE A | 02 |

Fig.19

CANDIDATE MANAGEMENT TABLE

| CANDIDATE NUMBER | DEVICE NAME | LU_ID | RAID GROUP NUMBER (#) | FLAG |
|---|---|---|---|---|
| 1 | STORAGE DEVICE A | 03 | 02 | — |
| 2 | STORAGE DEVICE A | 04 | 03 | — |
| 3 | STORAGE DEVICE B | 01 | 01 | — |
| 4 | STORAGE DEVICE B | 02 | 02 | — |

Fig.22

CANDIDATE MANAGEMENT TABLE

| CANDIDATE NUMBER | DEVICE NAME | RAID GROUP NUMBER (#) | FLAG |
|---|---|---|---|
| 1 | STORAGE DEVICE A | 02 | — |
| 2 | STORAGE DEVICE A | 03 | — |

Fig.24

COPY PAIR MANAGEMENT TABLE

| COPY SOURCE | | COPY DESTINATION | |
|---|---|---|---|
| DEVICE NAME | LU_ID | DEVICE NAME | LU_ID |
| STORAGE DEVICE A | 01 | STORAGE DEVICE B | 02 |
| STORAGE DEVICE A | 02 | STORAGE DEVICE A | 03 |

Fig.27

CANDIDATE MANAGEMENT TABLE

| CANDIDATE NUMBER | DEVICE NAME | LU_ID | RAID GROUP NUMBER (#) | FLAG |
|---|---|---|---|---|
| 1 | STORAGE DEVICE A | 01 | 01 | — |
| 2 | STORAGE DEVICE B | 02 | 02 | — |

MANAGEMENT OF NUMBER OF DISK GROUPS THAT CAN BE ACTIVATED IN STORAGE DEVICE

CROSS REFERENCE

The present application is based on, and claims priority from, Japanese Application No. 2005-323416 filed Nov. 8, 2005, the disclosure of which is herein incorporated by reference.

BACKGROUND

The present invention relates to a storage system technology.

A storage device includes a number of disks. If all of these disks are running simultaneously, a large amount of power is consumed by the storage device.

The amount of power consumed by the storage device is conventionally reduced by limiting the number of RAID groups that can be active simultaneously in the storage device.

However, if a management device manages an external storage device using a technology such as virtualization, it is conventionally difficult to properly use logical volumes on the storage device. This is because it is difficult for the management device to manage the number of active RAID groups in the storage device.

SUMMARY

The present invention solves the above-described problem of conventional technology, and there is need to provide a technique by which, if the number of active disk groups in an external storage device is restricted, an appropriate logical volume in the storage device can be used.

At least part of the above and the other related objects is attained by an apparatus of the present invention. The apparatus is a management apparatus for managing a storage device provided externally, comprises: a management data obtaining module that obtains management data indicating which of a plurality of disk groups included in the storage device is active, from the storage device; and a processing executor that executes predetermined processing with reference to the management data regarding the storage device in order to utilize a logical volume belonging to a disk group in the storage device while ensuring that the number of active disk groups in the storage device does not exceed an upper limit value.

In this apparatus, because predetermined processing for utilizing a logical volume belonging to a disk group within the storage device is executed with reference to the management data regarding to the storage device, while ensuring that the number of active disk groups in the storage device does not exceed an upper limit value, an appropriate logical volume can be used without being restricted due to the number of active disk groups in the storage device.

The above apparatus may further comprise a virtualization module that maps a logical volume included in at least one storage device to a virtual volume. The processing executor may comprise a candidate selection module that, if a logical volume is to be mapped to the virtual volume, selects with reference to the management data regarding the at least one storage device a plurality of candidates indicating a plurality of storage areas, each storage area being included in the at least one storage device and being usable to create the logical volume to be mapped to the virtual volume, while ensuring that the number of active disk groups in each storage device does not exceed the upper limit value; and a creation instruction module that instructs a particular storage device including a storage area corresponding to one candidate selected from among the plurality of candidates to create a logical volume in the storage area corresponding to the one candidate. The virtualization module may map the created logical volume to the virtual volume.

In this arrangement, a logical volume can be quickly mapped to a virtual volume. Namely, if a plurality of candidates indicating a plurality of storage areas, each of which can be used to create a logical volume, are selected while ensuring that the number of active disk groups in each storage device does not exceed the upper limit value, by using one candidate selected from among the plurality of candidates, a logical volume can be quickly created and mapped to a virtual volume.

In the above apparatus, the candidate selection module may comprise a utilization rate obtaining module that obtains a utilization rate of storage capacity of the virtual volume. If the utilization rate exceeds a predetermined value, the candidate selection module may select the plurality of candidates in order to map a new logical volume to the virtual volume.

In this arrangement, if the utilization rate of the storage capacity of the virtual volume exceeds a predetermined value, the capacity of the virtual volume can be quickly increased.

The above apparatus may further comprise a virtualization module that maps a logical volume included in at lease one storage device to a virtual volume. The processing executor may comprise: a candidate selection module that, if a logical volume is to be mapped to the virtual volume, selects with reference to the management data regarding the at least one storage device a plurality of candidates indicating a plurality of logical volumes, each logical volume being included in the at least one storage device and being usable to be mapped to the virtual volume, while ensuring that the number of active disk groups in each storage device does not exceed the upper limit value. The virtualization module may map a logical volume corresponding to one candidate selected from among the plurality of candidates to the virtual volume.

In this arrangement, a logical volume can be quickly mapped to a virtual volume. Namely, if a plurality of candidates indicating a plurality of logical volumes are selected while ensuring that the number of active disk groups in each storage device does not exceed the upper limit value, by using one candidate selected from among the plurality of candidates, a logical volume can be quickly mapped to a virtual volume.

In the above apparatus, the processing executor may comprise: a candidate selection module that, if a logical volume is to be created in at least one storage device, selects with reference to the management data regarding the at least one storage device a plurality of candidates indicating a plurality of storage areas, each storage area being included in the at least one storage device and being usable to create the logical volume, while ensuring that the number of active disk groups in each storage device does not exceed the upper limit value; and a creation instruction module that instructs a particular storage device including a storage area corresponding to one candidate selected from among the plurality of candidates to create a logical volume in the storage area corresponding to the one candidate.

In this arrangement, a logical volume can be quickly created in the storage device. Namely, if a plurality of candidates indicating a plurality of storage areas, each of which can be used to create a logical volume, are selected while ensuring that the number of active disk groups in each storage device does not exceed the upper limit value, by using one candidate selected from among the plurality of candidates, a logical volume can be quickly created.

In the above apparatus, at least one storage device may include a copy source logical volume belonging to a first disk group and a copy destination logical volume belonging a second disk group that is different from the first disk group. The processing executor may comprises: a target logical volume selection module that, if a request for reading data from the copy source logical volume included in a particular storage device is issued, selects with reference to the management data regarding the at least one storage device as a target logical volume for reading one of the copy source logical volume and the copy destination logical volume, while ensuring that the number of active disk groups in each storage device does not exceed the upper limit value; and a transmission module that transmits information regarding the target logical volume to the particular storage device including the copy source logical volume.

In this arrangement, if a request for reading data from a copy source logical volume is issued, the data can be quickly read out. Namely, if a copy source logical volume or a copy destination logical volume is selected as the target logical volume while ensuring that the number of active disk groups in each storage device does not exceed the upper limit value, by executing read processing with regard to that target logical volume, the data can be easily read out.

The present invention is also directed to a storage system including the management apparatus and the particular storage device. In this system, it is preferable that the particular storage device comprises: a controller that obtains the information regarding the target logical volume from the management apparatus and executes processing in accordance with the information. The controller, if the target logical volume is included in the particular storage device, executes read processing with regard to the target logical volume, and if the target logical volume is included in a storage device different from the particular storage device, instructs the different storage device to execute read processing with regard to the target logical volume.

It should be noted that the present invention may be actualized by a diversity of applications such as a management apparatus, a storage system including the management apparatus, a method for managing in these devices, computer programs that attain these methods or functions of these devices, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows the contents of a RAID group management table 224;

FIG. 4 shows the contents of a system configuration management table 424;

FIG. 5 shows the contents of a virtualization management table 124;

FIG. 6 shows the contents of an AOU management table 134;

FIG. 7 shows the contents of a system RAID group management table 144;

FIG. 12 shows the contents of a candidate management table 136;

FIG. 13 shows the contents of an updated candidate management table 136';

FIG. 16 shows the contents of a system configuration management table 424B;

FIG. 17 shows the contents of an external volume mapping table 324;

FIG. 19 shows the contents of a candidate management table 326;

FIG. 22 shows the contents of a candidate management table 544;

FIG. 24 shows the contents of a copy pair management table 644;

FIG. 27 shows the contents of a candidate management table 636; and

DESCRIPTION OF THE PREFERRED EMBODIMENT

Embodiments of the present invention are discussed below based on examples in the following order.

A. First embodiment:
   A-1. Network system configuration:
   A-1-1. Storage device configuration:
   A-1-2. Management server configuration:
   A-1-3. Virtualization device configuration:
   A-2. RAID group management process in each storage device:
   A-3. Generating process of system RAID group management table:
   A-4. Mapping of real volume to virtual volume:

B. Second embodiment:
   B-1. Network system configuration:
   B-1-2. Management server configuration:
   B-1-3. Advanced storage device configuration:
   B-2. Mapping of external volume to virtual volume:

C. Third embodiment:
   C-1. Network system configuration:
      C-1-1. Storage device configuration:
      C-1-2. Management server configuration:
   C-2. Creation of logical volume:

D. Fourth embodiment:
   D-1. Network system configuration:
      D-1-1. Storage device configuration:
      D-1-2. Management server configuration:
   D-2. Read processing:

E. Variations of storage device:

A. First Embodiment

Figure 1:
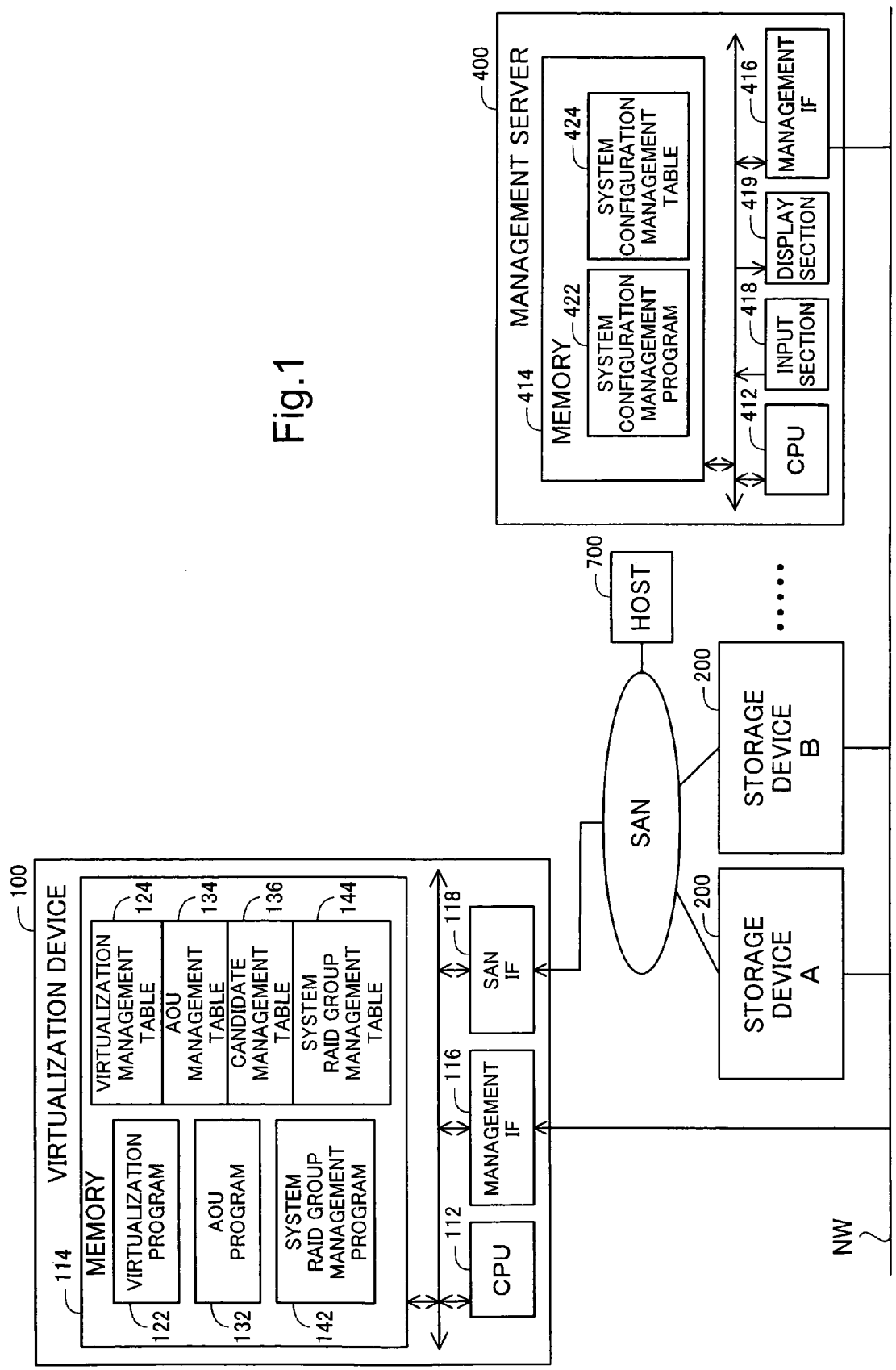
FIG. 1 shows the basic configuration of a network system of a first embodiment.

A-1. Network System Configuration:

FIG. 1 shows the basic configuration of a network system of a first embodiment. The network system includes a virtualization device 100, a plurality of storage devices 200, a management server 400, and a host 700 such as an application server. The virtualization device 100, the plurality of storage devices 200 and the host 700 are connected over a SAN (Storage Area Network). Furthermore, the virtualization device 100, the plurality of storage devices 200 and the management server 400 are connected over a management network NW.

As described below, a virtual volume is created in the virtualization device 100 and a logical volume (hereinafter termed "real volume") in the storage devices 200 is mapped to the virtual volume. If a virtual volume is used, the host 700 can access a real volume on a storage device 200 by accessing the virtual volume on the virtualization device 100 without consciousness of the storage device 200.

Figure 2:
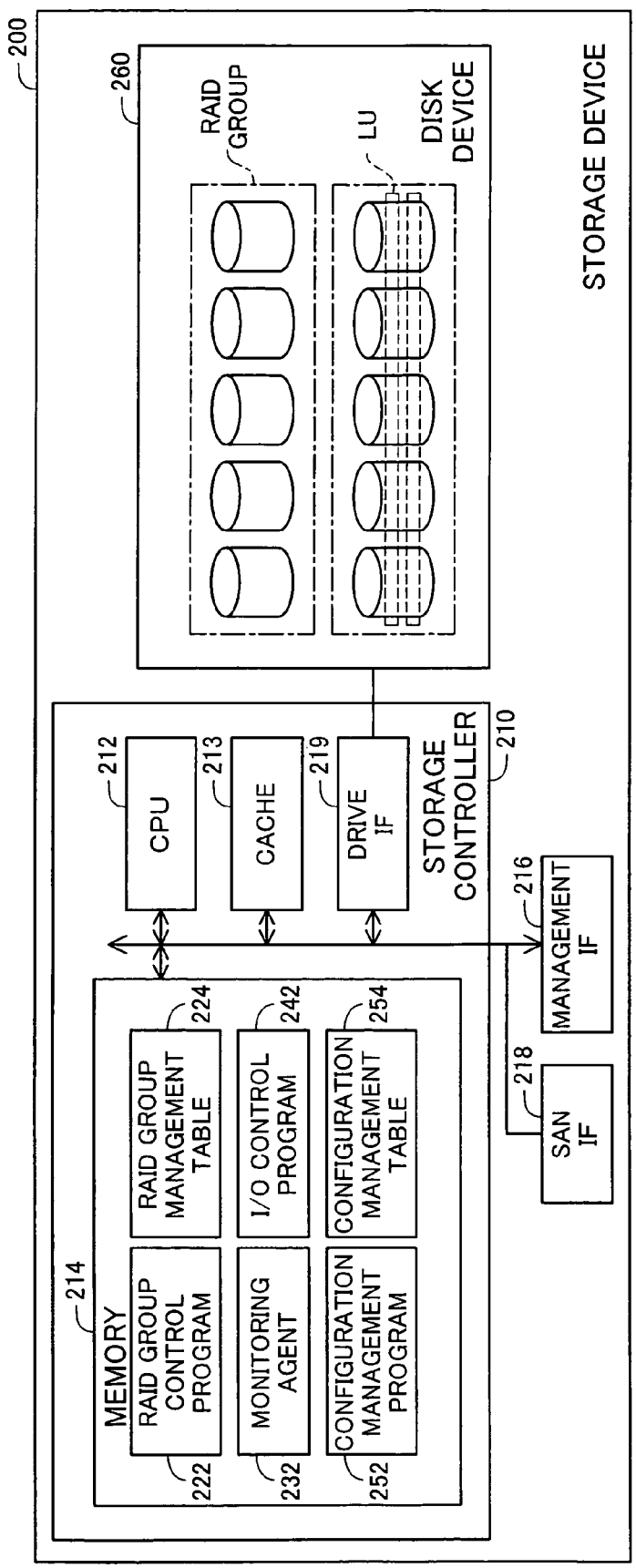
FIG. 2 shows the internal configuration of a storage device 200.

A-1-1. Storage Device Configuration:

FIG. 2 shows the internal configuration of the storage device 200. Each storage device 200 comprises a storage controller 210, a disk device 260, a management interface (IF) 216 connected to the management network NW and a SAN interface (IF) 218 connected to the SAN. The management IF 216 is an interface that enables management data to be exchanged with other devices such as the management server 400. The SAN IF 218 is an interface that enables data to be written to or read out from the disk device 260 to be exchanged with other devices such as the virtualization device 100 or the host 700.

The disk device 260 includes a number of hard disks. As shown in the drawing, the disk device 260 contains a plurality of RAID (Redundant Array of Independent (Inexpensive) Disks) groups, and each RAID group includes a plurality of hard disks. Each RAID group is configured to contain one or more logical volumes (LU).

The storage controller 210 comprises a CPU 212, a cache 213, a memory 214 such as a ROM or a RAM, and a drive interface (IF) 219, and has the function of controlling the disk device 260. The cache 213 is a storage area in which data to be written to or read out from the disk device 260 is temporarily stored. The drive IF 219 is an interface that controls the operation of the hard disks in the disk device 260 and reads and writes data to and from the hard disks.

The memory 214 stores a RAID group control program 222, a RAID group management table 224, a monitoring agent 232, an I/O control program 242, a configuration management program 252 and a configuration management table 254.

The configuration management program 252 manages the configuration of the storage device using the configuration management table 254. Specifically, the configuration management program 252 creates a logical volume in a RAID group, and creates and updates the configuration management table 254 that indicates the associations between the logical volumes and the RAID groups in the disk device 260. In addition, when the information in the configuration management table 254 is changed, the configuration management program 252 transmits the table information to the management server 400.

The I/O control program 242 controls the input and output of data to and from the disk device 260 based on I/O commands given from the virtualization device 100 or the host 700. Specifically, if an access request (i.e., a read request or write request) pertaining to a particular logical volume on the disk device 260 is received from the virtualization device 100 or the host 700, the I/O control program 242 executes access processing (read processing or write processing) with respect to the particular logical volume.

However, the I/O control program 242 asks the RAID group control program 222 whether or not access processing can be executed, and if access processing is permitted, the I/O control program 242 executes access processing with respect to the particular logical volume. If access processing is not permitted, the I/O control program 242 is instructed by the RAID group control program 222 to wait and waits until access processing is permitted. In this case, the I/O control program 242 notifies the virtualization device 100 or the host 700 that it is on waiting status.

The RAID group control program 222 manages the RAID groups included in the storage device 200 using the RAID group management table 224.

FIG. 3 shows the contents of the RAID group management table 224. As shown in the drawing, in the RAID group management table 224, the items of "Number of active RAID groups", "Active RAID group number (#)" and "Upper limit value" are registered. "Number of active RAID groups" indicates the number of active RAID groups. "Active RAID group number (#)" indicates the identification number (#) of each active RAID group. "Upper limit value" indicates the upper limit value regarding the number of RAID groups that can be active at any given time. The upper limit value is set in advance in accordance with the specifications of the storage device or by the network system administrator.

The RAID group control program 222 controls the activation of RAID groups with reference to the RAID group management table 224 to ensure that the number of active RAID groups is not exceeded the upper limit value. As a result, the power consumption of the storage device 200 is constrained.

Specifically, if an access request is issued with regard to a particular logical volume, the RAID group control program 222 determines whether or not the use of a specific RAID group that includes the particular logical volume is restricted based on the upper limit value, with reference to the configuration management table 254. If the use of the specific RAID group is not restricted, the RAID group control program 222 permits the I/O control program 242 to execute access processing. On the other hand, if the use of the specific RAID group is restricted, the RAID group control program 222 instructs the I/O control program 242 to wait.

Further, the RAID group control program 222 updates the RAID group management table 224 if a RAID group has been activated or deactivated.

The monitoring agent 232 (FIG. 2) monitors the RAID group management table 224 and supplies information of the RAID group management table to the virtualization device 100 each time the information in the table 224 is changed.

A-1-2. Management Server Configuration:

The management server 400 (FIG. 1) comprises a CPU 412, a memory 414, a management IF 416, an input section 418 such as a keyboard or mouse, and a display section 419.

The memory 414 stores a system configuration management program 422 and a system configuration management table 424.

The system configuration management program 422 obtains information indicating the configuration of each storage device 200 from the configuration management program 252 of each storage device 200 and creates and updates the system configuration management table 424.

FIG. 4 shows the contents of the system configuration management table 424. As shown in the drawing, in the table 424, "Device name", "Model", "LU_ID", "RAID group number (#) (RAID level)", "Size" and "Used size" are registered for each logical volume. "Device name" refers to name of a storage device 200 to which a particular logical volume belongs, while "Model" refers to the model of the storage device 200. "LU_ID" refers to the identification number of the particular logical volume (LU), while "RAID group number (#) (RAID level)" refers to the number (#) and RAID level of a RAID group to which the particular logical volume belongs. "Size" refers to the total capacity of the particular logical volume, while "Used size" refers to the amount of storage capacity being used on that logical volume. An "Unassigned" designation in the "LU_ID" field indicates that a logical volume has not yet been created for that storage area.

For example, referring to the second row of the system configuration management table 424 of FIG. 4, it can be seen that the "Storage device A" includes a RAID group "02" of the RAID level "5", that this RAID group includes a logical volume "02", and that "2 G" bytes of storage capacity of the "50 G" bytes of total capacity of the logical volume is being used.

Among the information for the plurality of storage devices registered in the system configuration management table 424, the "Model", LU_ID", "RAID group (RAID level)", "Size" and "Used size" for each storage device are registered in the configuration management table 254 of the corresponding storage device 200 described above (FIG. 2).

A-1-3. Virtualization Device Configuration:

The virtualization device 100 (FIG. 1) comprises a CPU 112, a memory 114 such as a ROM or RAM, a management IF 116 and a SAN IF 118.

The memory 114 stores a virtualization program 122, a virtualization management table 124, an AOU (Allocation On Use) program 132, an AOU management table 134, a candidate management table 136, a system RAID group management program 142 and a system RAID group management table 144.

The virtualization program 122 creates a virtual volume, maps logical volumes (real volumes) in storage devices 200 to the virtual volume, and manages the virtual volume. The virtualization program 122 creates the virtualization management table 124 with reference to the system configuration management table 424 (FIG. 4).

FIG. 5 shows the contents of the virtualization management table 124. As shown in the drawing, in the table 124, the items of "Virtual volume ID", "Virtual volume size", "Real volume", "Real volume size" and "Used size" are registered for each virtual volume. "Virtual volume ID" refers to the identification number of a given virtual volume. "Virtual volume size" is a set value for the virtual volume and refers to its maximum storage capacity. "Real volume" refers to a logical volume (real volume) in storage devices 200, which is expressed using the "Device name" of the storage device 200 and the identification number "LU_ID" of the real volume. "Real volume size" refers to the total storage capacity of each real volume, while "Used size" refers to the amount of storage capacity being used on that real volume.

In FIG. 5, the real volumes "01" and "02" of the "Storage device A" are mapped to the virtual volume "001". The "real volume sizes" and "used sizes" of the two real volumes are obtained from the system configuration management table 424 (FIG. 4). In FIG. 5, the size of the virtual volume "001" is set to "1 T" bytes, but the actual size of the virtual volume "001" is 100 G (=50 G+50 G) bytes obtained by adding the sizes of the two real volumes.

The AOU program 132 (FIG. 1) executes processing for adding a real volume to the virtual volume using the AOU management table 134, if the actual remaining storage capacity of the virtual volume has become small, more specifically if the utilization rate of storage capacity of the virtual volume has become not less than the threshold value.

FIG. 6 shows the contents of the AOU management table 134. As shown in the drawing, in the table 134, the items of "Virtual volume ID", "Virtual volume size", "Utilization rate threshold value" and "Additional real volume conditions" are registered for each virtual volume. "Utilization rate threshold value" refers to a threshold value for an amount of storage capacity used (utilization rate) based on the actual size of the virtual volume. "Additional real volume conditions" refers to the conditions for a real volume to be added (termed the "additional real volume" below) to the virtual volume.

In FIG. 6, "90%" is registered as the threshold value for the utilization rate of the virtual volume "001", and "50 G" bytes and a RAID level of "5" are registered as the additional real volume conditions. "Utilization rate threshold value" and "Additional real volume conditions" are preset by the administrator, for example.

The AOU program 132 (FIG. 1) creates a candidate management table 136 (described below) with reference to the system configuration management table 424 (FIG. 4), if the current utilization rate of the virtual volume equals or exceeds the threshold value. In the candidate management table 136, candidates for storage areas, each of which can be used to create a real volume that satisfies the additional real volume conditions, are registered.

In addition, the AOU program 132 instructs the configuration management program 252 of a storage device 200 that includes a storage area corresponding to one of the candidates to create a real volume. Further, the AOU program 132 instructs the virtualization program 122 to add (map) the created real volume to the virtual volume.

The system RAID group management program 142 (FIG. 1) obtains information regarding the RAID group management table 224 from the monitoring agent 232 (FIG. 2) of each storage device 200 and then creates and updates a system RAID group management table 144.

FIG. 7 shows the contents of the system RAID group management table 144. As shown in the drawing, in the table 144, the "Number of active RAID groups", "Active RAID group number (#)" and "Upper limit value" are registered for each storage device.

For example, it can be seen from the table 144 in FIG. 7 that in the "Storage device B", there are no active RAID groups and the upper limit value is "1". The information pertaining to the "Storage device A" is the same as the corresponding information in FIG. 3.

Further, the system RAID group management program 142 (FIG. 1) determines, with reference to the system RAID group management table 144, whether or not each candidate registered in the candidate management table 136 is suitable as a storage area in which an additional real volume is created. As described below, this determination takes into account the number of active RAID groups in each storage device.

Figure 8:
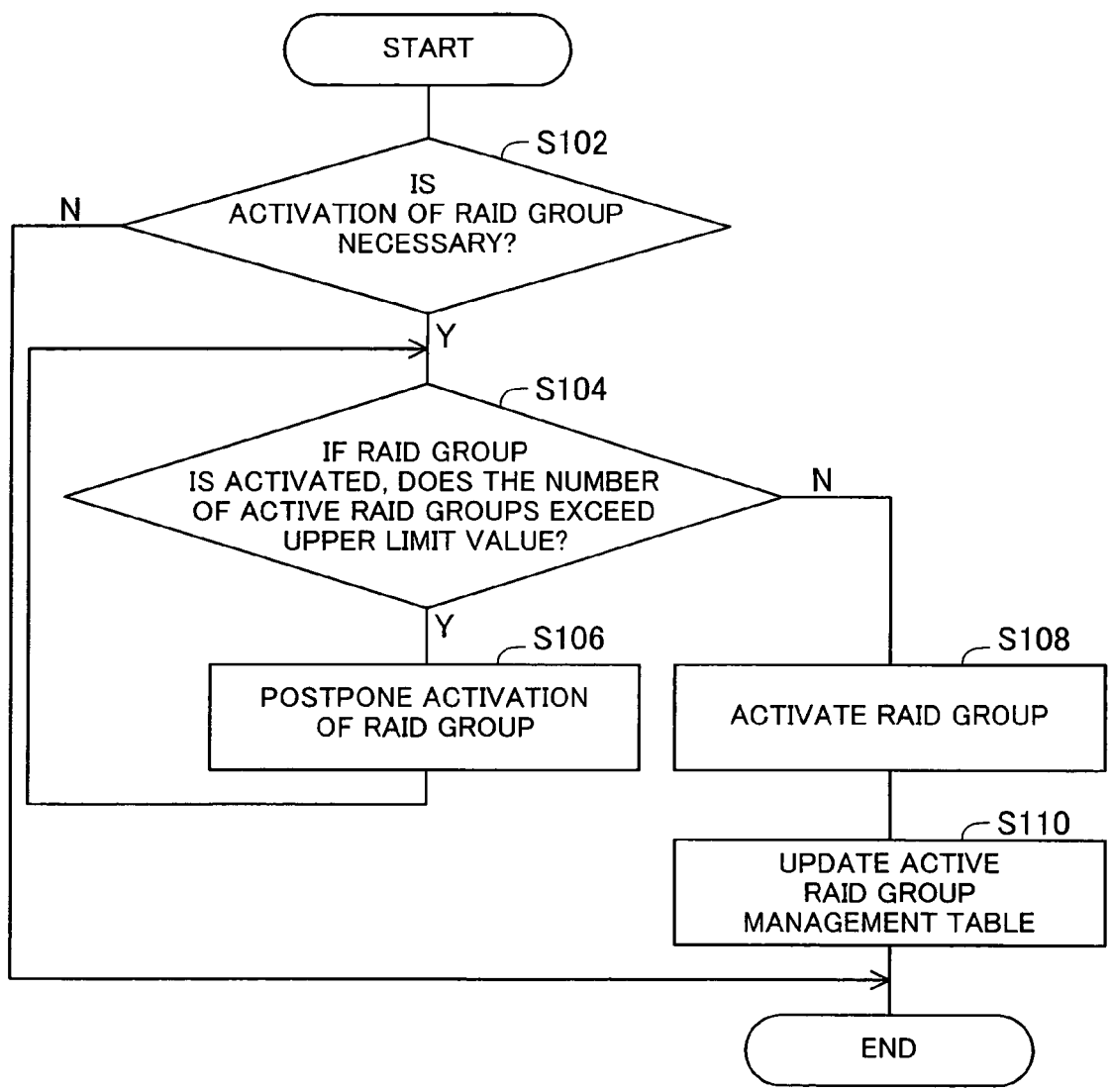
FIG. 8 is a flow chart showing the sequence of operations for the RAID group management process executed in the storage device 200.

A-2. RAID Group Management Process in Each Storage Device:

FIG. 8 is a flow chart showing the sequence of operations for the RAID group management process executed in the storage device 200. The process of FIG. 8 is executed by the RAID group control program 222 (FIG. 2). This process is executed when the I/O control program 242 receives from the virtualization device 100 or the host 700 an access request requesting access to a particular logical volume in the storage device 200 and then asks the RAID group control program 222 whether or not the execution of access processing is permitted.

In step S102, the RAID group control program 222 determines, with reference to the RAID group management table 224, whether or not a RAID group that is currently not active needs to be activated.

Specifically, the RAID group control program 222 at first checks the RAID group number (#) to which the particular logical volume belongs, with reference to the configuration management table 254. The RAID group control program 222 then determines, with reference to the RAID group management table 224 (FIG. 3), whether or not the RAID group number (#) to which the particular logical volume belongs is registered in the "Active RAID group number (#)" column. If it is registered, i.e., if the particular logical volume belongs to a RAID group that has been activated, it is determined that a RAID group need not be newly activated. If it is not registered, i.e., if the particular logical volume belongs to another RAID group that is not active, it is determined that the RAID group (that is the above "another RAID group") must be activated.

If a RAID group need not be newly activated, the process shown in FIG. 8 ends. In this case, the RAID group control program 222 permits the I/O control program 242 to execute access processing. If a RAID group must be newly activated, on the other hand, the process of FIG. 8 proceeds to step S104.

In step S104, the RAID group control program 222 determines with reference to the RAID group management table 224 whether or not the hypothetical number of active RAID groups exceeds the upper limit value if a RAID group is newly activated. For example, in FIG. 3, the upper limit value is "2", and the number of active RAID groups is "2". In this case, it is determined that if a RAID group is activated, the hypothetical number of active RAID groups exceeds the upper limit value of "2" because the hypothetical number of active RAID groups becomes "3".

If it is determined that the hypothetical number of active RAID groups exceeds the upper limit value, the process of FIG. 8 proceeds to step S106. On the other hand, if it is determined that the hypothetical number of active RAID groups does not exceed the upper limit value, the process of FIG. 8 proceeds to step S108.

In step S106, the activation of the RAID group to which the particular logical volume belongs is postponed and the process of FIG. 8 returns to step S104. The operations of steps S104 and S106 are repeated until one of the currently active RAID groups becomes deactivated. As a result, the activation of a higher number of RAID groups than the upper limit value is prevented. In step S106, the RAID group control program 222 instructs the I/O control program 242 to wait.

In step S108, the RAID group control program 222 activates the RAID group to which the particular logical volume belongs. In this case, the RAID group control program 222 permits the I/O control program 242 to execute access processing.

In step S110, the RAID group control program 222 updates the RAID group management table 224 (FIG. 3) to reflect the activation of the RAID group. Specifically, the value in "Number of active RAID groups" is incremented and the newly activated RAID group number (#) is added to "Active RAID group number (#)".

Step S110 shown in FIG. 8 describes the situation in which the RAID group management table 224 is updated based on the newly activation of a RAID group, but the RAID group management table 224 is also updated when a currently active RAID group is deactivated. Namely, if access processing to access the logical volume belonging to an active RAID group ends, the RAID group control program 222 deactivates that RAID group. The RAID group control program 222 then updates the RAID group management table 224 to reflect the deactivation of that RAID group. Specifically, the value in "Number of active RAID groups" is decremented and the deactivated RAID group number (#) is deleted from "Active RAID group number (#)".

As described above, the activation of RAID groups is controlled to ensure that the number of active RAID groups for each storage device 200 does not exceed the upper limit value.

Incidentally, if a virtualization device maps a real volume of each storage device to a virtual volume, the virtualization device cannot conventionally manage the number of active RAID groups in each storage device. As a result, a situation may arise in which a real volume of each storage device cannot be mapped to a virtual volume. Specifically, a situation may occur in which even if the virtualization device attempts to map a particular real volume of a given storage device to the virtual volume, a RAID group to which the particular real volume belongs cannot be activated. Accordingly, in this embodiment, the system is designed to ensure that the virtualization device 100 can quickly map a real volume of each storage device 200 to the virtual volume.

Figure 9:
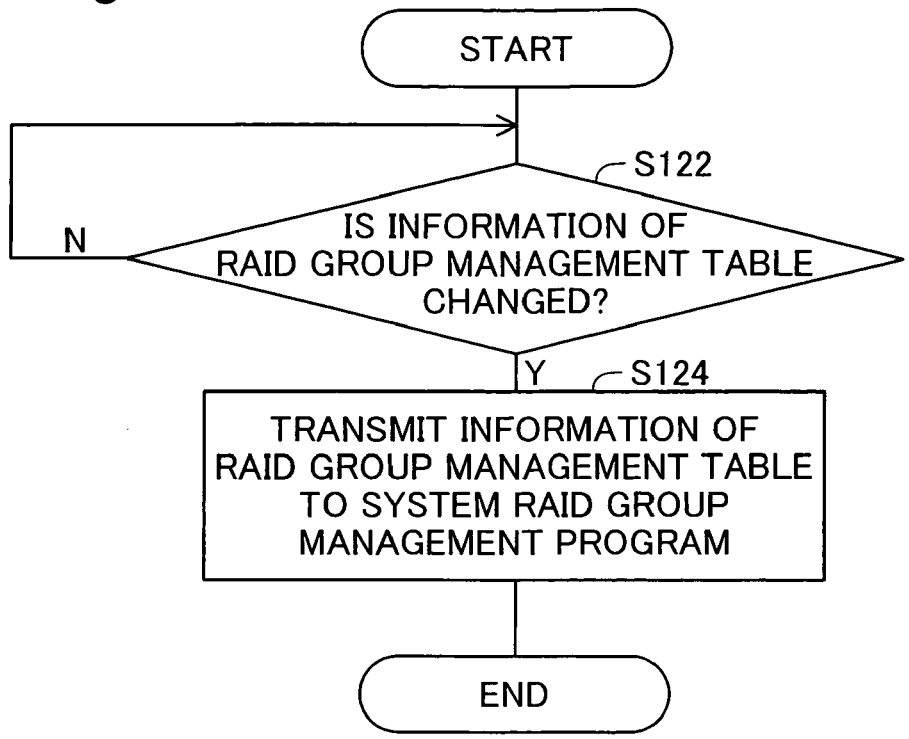
FIGS. 9 and 10 are flow charts showing the sequence of operations for generating the system RAID group management table 144.
Figure 10:
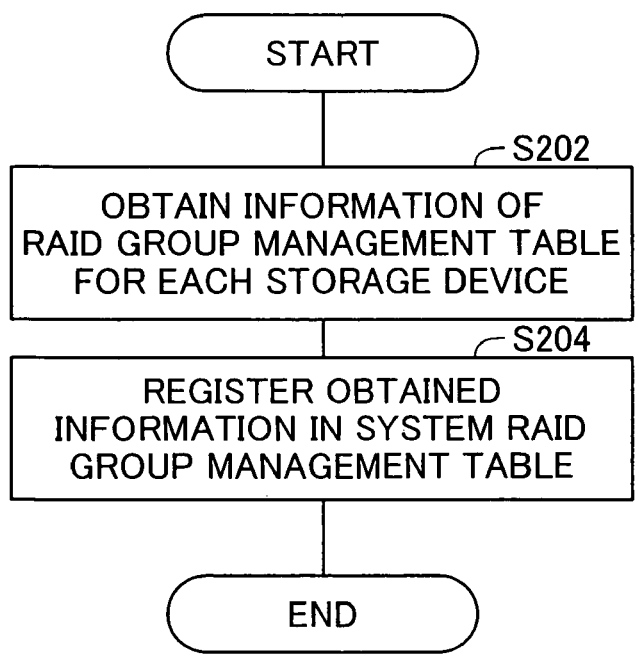

A-3. Generating Process of System RAID Group Management Table:

FIGS. 9 and 10 are flow charts showing the sequence of operations for generating the system RAID group management table 144. The process shown in FIG. 9 is executed by the monitoring agent 232 of each storage device 200 (FIG. 2), while the process shown in FIG. 10 is executed by the system RAID group management program 142 (FIG. 1).

In step S122 of FIG. 9, the monitoring agent 232 determines whether or not the information of the RAID group management table 224 has been changed. The information of the RAID group management table 224 is changed when a RAID group is newly activated or deactivated, or when the table 224 is initialized.

In step S124, the monitoring agent 232 sends information of the RAID group management table 224 to the system RAID group management program 142 of the virtualization device 100.

In step S202 of FIG. 10, the system RAID group management program 142 obtains the information of the RAID group management table 224 supplied by the monitoring agent 232 of each storage device 200.

In step S204, the system RAID group management program 142 registers the obtained information of the RAID group management table 224 for each storage device 200 in the system RAID group management table 144. As a result, the system RAID group management table 144 shown in FIG. 7 is created.

In this embodiment, only if the information of the RAID group management table 224 for each storage device 200 has been changed, the system RAID group management program 142 obtains the information from the monitoring agent 232 of each storage device 200. However, instead of or in addition to this method, the system RAID group management program 142 may obtain the information of the RAID group management table 224 from each storage device 200 at prescribed intervals.

Figure 11:
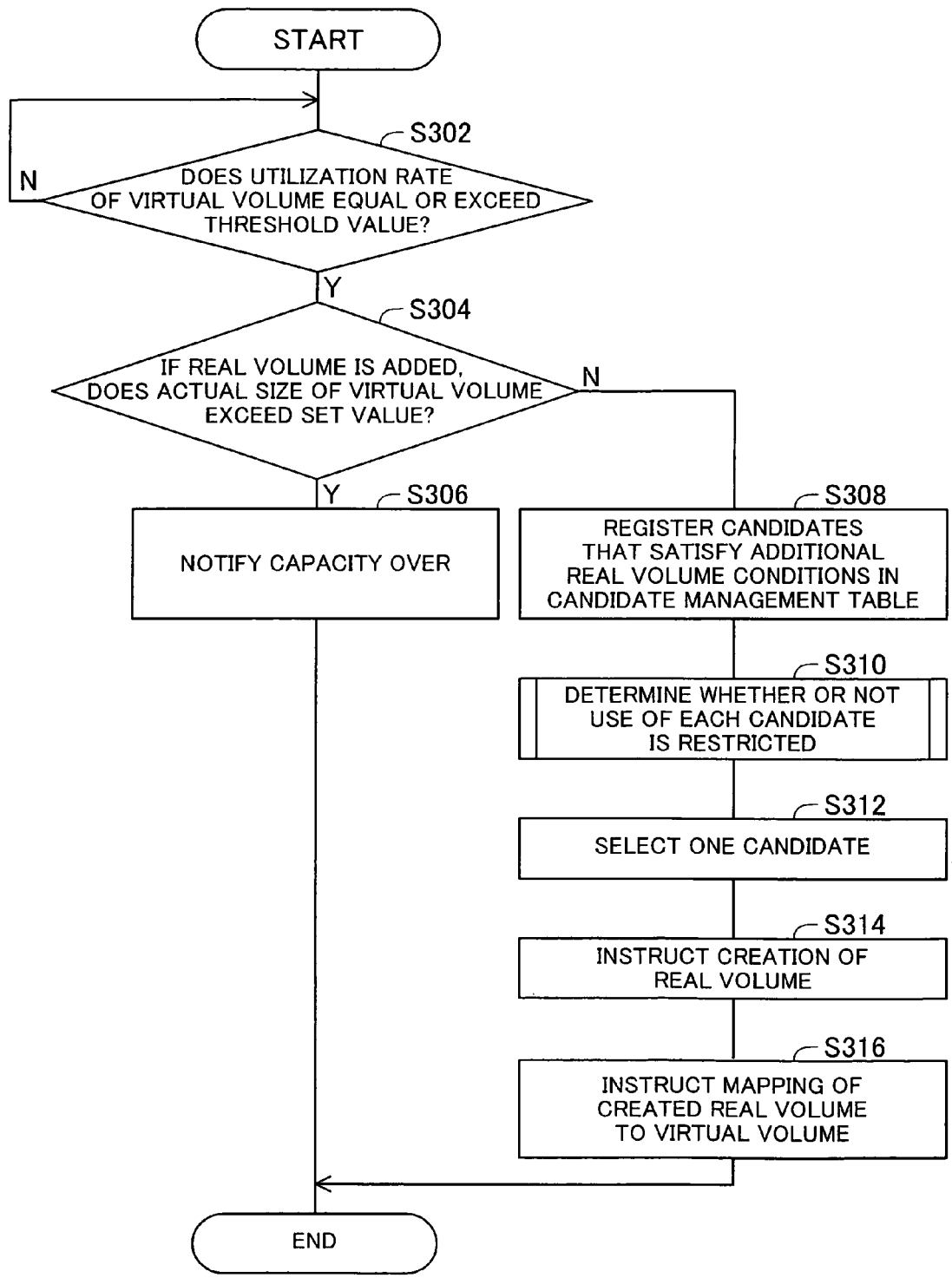
FIG. 11 is a flow chart showing the sequence of operations executed if the actual capacity of a virtual volume is to be increased.

A-4. Mapping of Real Volume to Virtual Volume:

FIG. 11 is a flow chart showing the sequence of operations executed if the actual capacity of a virtual volume is to be increased. The process shown in FIG. 11 is executed in cooperation with the AOU program 132 and system RAID group management program 142 of the virtualization device 100 (FIG. 1).

In step S302, the AOU program 132 determines whether or not the utilization rate of the virtual volume, in other words, the utilization rate of the one or more real volumes already mapped to the virtual volume, equals or exceeds the threshold value.

Specifically, the AOU program 132 calculates the utilization rate of the one or more real volumes that constitutes the virtual volume, with reference to the virtualization management table 124 (FIG. 5). For example, in FIG. 5, because the total size of the two real volumes constituting the virtual volume "001" is 100 G (=50 G+50 G) bytes, and the total amount of capacity used is 52 G (=50 G+2 G) bytes, the utilization rate is calculated as 52%. Next, the AOU program 132 determines whether or not the calculated utilization rate equals or exceeds the threshold value, with reference to the AOU management table 134 (FIG. 6). For example, because the utilization rate threshold value for the virtual volume "001" is set at "90%" in FIG. 6, it is determined that the calculated utilization rate is lower than the threshold value.

If it is determined in step S302 that the utilization rate of the virtual volume is lower than the threshold value, the operation of step S302 is repeated. If it is determined in step S302 that the utilization rate of the virtual volume equals or exceeds the threshold value, on the other hand, the process proceeds to step S304.

In step S304, the AOU program 132 determines with reference to the AOU management table 134 (FIG. 6) whether or not the actual size of the virtual volume exceeds the set value (i.e., the maximum capacity) if a real volume is added (mapped) to the virtual volume.

Specifically, at first, the AOU program 132 calculates the sum of the total size of the one or more real volumes constituting the virtual volume and the size for the additional real volume set as the additional real volume condition. In FIG. 6, because this additional real volume condition is set at "50 G" bytes, the sum of the total size (10 G bytes) of the two real volumes constituting the virtual volume "001" and the size (50 G bytes) for the additional real volume is calculated to be 150 G bytes. The AOU program 132 then determines whether or not the calculated sum exceeds the set value for the size of the virtual volume. For example, because the virtual volume size is set to "1 T" bytes in FIG. 6, it is determined that the sum of 150 G bytes does not exceed the set value.

If it is determined in step S304 that the calculated sum exceeds the set value, the process proceeds to step S306. If it is determined in step S304 that the calculated sum does not exceed the set value, the process proceeds to step S308.

In step S306, the AOU program 132 notifies the administrator of a capacity over. Specifically, the administrator is notified that a new real volume cannot be added because the set value for the virtual volume size will be exceeded.

In step S308, the AOU program 132 refers to the system configuration management table 424 (FIG. 4) and the AOU management table 134 (FIG. 6), selects candidate for storage area, each of which can be used to create an additional real volume that satisfies the additional real volume conditions, and generates the candidate management table 136 in which the candidate is registered.

FIG. 12 shows the contents of the candidate management table 136. As shown in the drawing, in the table 136, the items of "Device name", "RAID group number (#)" and "Flag" are registered for each storage area that can be used to create an additional real volume. No significant values are registered in the "Flag" column yet.

In FIG. 12, the RAID group "02" of the "Storage device A" is registered to the candidate number "1". The two RAID groups "01", "02" of the "Storage device B" are registered to the candidate number "3". The RAID group "02" of the "Storage device A" and the RAID group "01" of the "Storage device B" are registered to candidate number "5".

As described above, in this embodiment, storage areas consisting of one or more partial storage areas in one or more RAID groups in one or more storage devices can be selected as the storage area that can be used to create an additional real volume. Namely, not only a single storage area in a single RAID group in a single storage device, but also a storage area consisting of a plurality of partial storage areas in a plurality of RAID groups in a single storage device, and a storage area consisting of a plurality of partial storage areas in a plurality of RAID groups in a plurality of storage devices can be selected as the storage area that can be used to create an additional real volume.

The candidate management table 136 is created with reference to the system configuration management table 424 (FIG. 4) and the AOU management table 134 (FIG. 6), as described above. Specifically, the information regarding the rows in which the "LU_ID" indicates "unassigned" among the plurality of rows registered in the system configuration management table 424 is used for reference. A plurality of candidates for storage areas, each of which can be used to create an additional real volume satisfying the "additional real volume conditions" in the AOU management table 134 (FIG. 6) are then registered in the candidate management table 136.

For example, because the unassigned area belonging to the RAID group "02" of the "Storage area A" registered in the third row of FIG. 4 has a size of "80 G" bytes and is set to RAID level "5", it satisfies the additional real volume conditions "50 G (RAID5)" shown in FIG. 6. As a result, the information pertaining to the unassigned area in the third row is registered in the candidate management table 136 as the candidate number "1" in FIG. 12.

In addition, because the unassigned area belonging to the RAID group "01" of the "Storage area B" registered in the fifth row of FIG. 4 has a size of "20 G" bytes, which is smaller than "50 G" bytes, it does not satisfy the additional real volume condition. However, because the two unassigned areas belonging to the two RAID groups "01", "02" in the "Storage area B" registered in the fifth and sixth rows of FIG. 4 together have a total size of 50 G (=20 G+30 G) bytes, the two unassigned areas satisfies the additional real volume condition. As a result, the information pertaining to the two unassigned areas in the fifth and sixth rows is registered in the candidate management table 136 as the candidate number "3" in FIG. 12.

Similarly, because the unassigned area belonging to the RAID group "01" of the "Storage area B" registered in the fifth row of FIG. 4 has a size of "20 G" bytes, which is smaller than "50 G" bytes, it does not satisfy the additional real volume condition. However, because the first unassigned area belonging to the RAID group "01" of the "Storage area B" registered in the fifth row of FIG. 4 and the second unassigned area belonging to the RAID group "02" in the "Storage area A" registered in the third row of FIG. 4 together have a total size of 100 G (=20 G+80 G) bytes, the two unassigned areas satisfy the additional real volume condition. As a result, the information pertaining to the two unassigned areas in the third and fifth rows is registered in the candidate management table 136 as the candidate number "5" in FIG. 12.

In this embodiment, as shown in connection with the candidate number "5", a storage area consisting two or more partial storage areas in two or more storage devices can be chosen as a storage area candidate that can be used to created an additional real volume, but this type of storage area need not be eligible as a candidate.

In step S310 (FIG. 11), the system RAID group management program 142 determines, using the system RAID group management table 144 (FIG. 7), whether or not the use of each candidate is restricted, according to an instruction from the AOU program 132. Specifically, it is determined whether or not the use of a storage area corresponding to each candidate is restricted by the upper limit value for the number of active RAID groups. The system RAID group management program 142 then updates the candidate management table 136 based on the results of this determination. The specific sequence of operations of this step S310 will be described below.

FIG. 13 shows the contents of an updated candidate management table 136'. FIG. 13 is substantially the same as FIG. 12, except that a value of "1" or "0" is registered in the "Flag" column. Candidate having a registered flag of "1" indicates that the use of the corresponding storage area is not restricted, while candidate having a registered flag of "0" indicates that the use of the corresponding storage area is restricted. Here, "the use of a storage area is restricted" means that the RAID group to which the storage area belongs is inactive and that activation of the RAID group is restricted by the upper limit value.

In this embodiment, the candidate management tables 136, 136" have a "Flag" column, but this "Flag" column may be omitted. In this case, candidates for which the flag should be set to "1" may be retained in the candidate management table 136, while candidates for which the flag should be sent to "0" may be deleted from the candidate management table 136.

In step S312 (FIG. 11), the AOU program 132 selects one optimal candidate from among the candidates that are not subject to a use restriction in the updated candidate management table 136', i.e., from among the candidates for which the flag is set to "1". The selection in step S132 is carried out based on preset selection rules.

The selection rules may comprise the following, for example:

Selection priority is given to a candidate that includes only a storage area in a single storage device.

Selection priority is given to a candidate that includes only a storage area within a single RAID group in a single storage device.

Selection priority is given to a candidate that includes a storage area within a single RAID group in a single storage device, wherein the storage area has a size equal to the size set as the additional real volume condition.

Other rules may be used as selection rules, such as a rule that gives selection priority to a candidate that includes a storage area not requiring the newly activation of a RAID group. However, in this case, it is preferred that the value of the flag for each candidate is updated based on whether the newly activation of a RAID group is required. For example, the flag may be set to "2" where the newly activation of a RAID group is not required and set to "1" where the newly activation of a RAID group is required. If this is done, a candidate whose storage area is not subject to a use restriction and does not require newly activation of a RAID group can be easily selected.

By using of selection rules in this fashion, one optimal candidate can be easily selected from among a plurality of candidates not subject to a use restriction.

In this embodiment, one candidate is selected by the AOU program 132 in step S312, but instead of this, one candidate may be selected by the administrator. In this case, the AOU program 132 may provide the administrator of the management server 400 with the information of the candidate management table 136' obtained in step S310 and then select one candidate according to the administrator's selection instruction given from the management server 400, for example. In this case, only candidates having a flag of "1" may be displayed on the display section 419 of the management server 400, or all of the candidates may be displayed and classified by the value of their flag.

In step S314, the AOU program 132 instructs the storage device 200 that includes the storage area (unassigned area) corresponding to the one candidate selected in step S312 to create a real volume.

In this case, the RAID group control program 222 of the storage device 200 executes the process shown in FIG. 8, and if the RAID group to which the storage area (unassigned area) selected in step S312 belongs must be activated, activates that RAID group (step S108). However, because the use of this storage area (unassigned area) is not restricted by the upper limit value (see step S310), the operations of steps S104, S106 in FIG. 8 are not executed.

The configuration management program 252 of the storage device 200 then creates additional real volume in the storage area (unassigned area) selected in step S312 and assigns an identification number (LU_ID) thereto. The size of the created additional real volume is the size compatible with the additional real volume condition (50 G bytes). Contemporaneously with the creation of the additional real volume, the configuration management table 254 is updated by the configuration management program 252, and the system configuration management table 424 is updated by the system configuration management program 422 of the management server 400.

If the selected candidate corresponds to a storage area consisting of two or more partial storage areas in a single storage device, the creation of two or more additional real volumes on that storage device is instructed. If the selected candidate corresponds to a storage area consisting of two or more partial storage areas in two or more storage devices, the creation of two or more additional real volumes on two or more storage devices is instructed. In this case as well, the total size of the two or more additional real volumes is a size compatible with the additional real volume condition.

In step S316, the AOU program 132 instructs the virtualization program 122 to add (map) the created real volume to the virtual volume.

Specifically, the AOU program 132 obtains the identification number (LU_ID) of the newly created additional real volume from the configuration management program 252 of the storage device 200, and notifies the virtualization program 122 of the device name of the storage device and the identification number (LU_ID) of the additional real volume. The virtualization program 122 then adds (maps) the additional real volume created in the storage device to the virtual volume. When this is done, the virtualization program 122 updates the virtualization management table 124 (FIG. 5).

Figure 14:
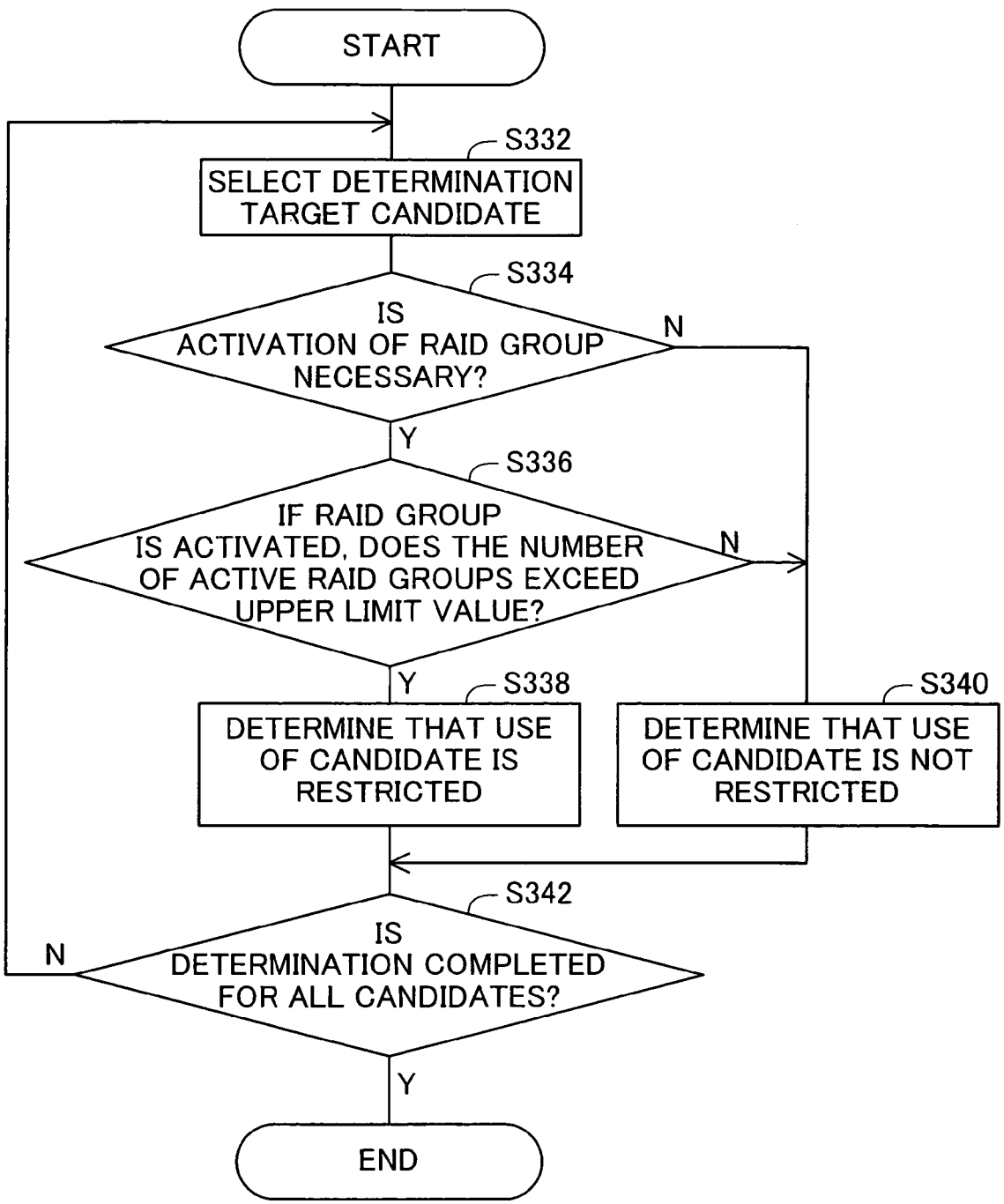
FIG. 14 shows the specific operations of step S310 in FIG. 11.

FIG. 14 shows the specific operations of the step S310 in FIG. 11. In step S332, the system RAID group management program 142 selects a candidate for determination (hereinafter termed "target candidate") from among the plurality of candidates registered in the candidate management table 136.

In step S334, the system RAID group management program 142 determines, with reference to the system RAID group management table 144 (FIG. 7), whether or not the use of the storage area corresponding to the target candidate as the additional real volume requires the activation of an inactive RAID group.

Specifically, the system RAID group management program 142 determines whether or not the number (#) of a RAID group in a particular storage device to which the storage area corresponding to the target candidate belongs is registered in the "Active RAID group number (#)" column for the particular storage device in the system RAID group management table 144 (FIG. 7). If it is registered, i.e., if the storage area corresponding to the target candidate belongs to an already-active RAID group within the particular storage device, it is determined that a different RAID group need not be activated. If it is not registered, i.e., if the storage area corresponding to the target candidate belongs to an inactive RAID group within the particular storage device, it is determined that the inactive RAID group to which the storage area belongs must be activated.

For example, in the candidate management table 136 of FIG. 12, the candidate number "2" represents a storage area that belongs to the RAID group "03" of the storage device A. Referring to the system RAID group management table 144 (FIG. 7), it can be seen that the RAID group "03" of the storage device A is inactive. As a result, it is determined that if the storage area corresponding to the candidate number "2" is to be used as an additional real volume, the inactive RAID group "03" must be activated.

If the target candidate corresponds to a storage area consisting of two or more partial storage areas belonging to two or more RAID groups in one storage device, the determination of whether or not a RAID group must be newly activated is executed for each partial storage area. If the target candidate corresponds to a storage area consisting of two or more partial storage areas belonging to two or more RAID groups in two or more storage devices, the determination of whether or not a RAID group must be newly activated is executed for each storage device and for each partial storage area.

If a RAID group must be newly activated, the process shown in FIG. 14 proceeds to step S336, while if a RAID group need not be newly activated, the process proceeds to step S340.

In step S340, the system RAID group management program 142 determines that the use of the target candidate is not restricted. Specifically, it is determined that the use of the storage area corresponding to the target candidate as an additional real volume is not restricted by the upper limit value regarding the number of active RAID groups. At this time, the system RAID group management program 142 updates the candidate management table 136. Specifically, the flag for the target candidate is set to "1".

In step S336, the system RAID group management program 142 determines with reference to the system RAID group management table 144 whether or not the hypothetical number of active RAID groups exceeds the upper limit value if a RAID group is newly activated.

For example, in the candidate management table 136 of FIG. 12, the candidate number "2" represents a storage area that belongs to the RAID group "03" in the storage device A. Referring to the system RAID group management table 144 (FIG. 7), it can be seen that the number of active RAID groups in the storage device A is "2" and the upper limit value is "2". It is determined that if the RAID group "03" is activated, the hypothetical number of active RAID groups exceeds the upper limit value of "2" because the hypothetical number of active RAID groups becomes "3".

The determination of step S336 is executed for each storage device that requires newly activation of a RAID group. Specifically, if it is determined that the activation of a RAID group in one storage device is necessary in step S334, the above determination is carried out for that storage device. If it is determined that the activations of a RAID group in a first storage device and a RAID group in a second storage device are necessary in step S334, the above determination is carried out for both the first and second storage devices.

If it is determined that the hypothetical number of active RAID groups exceeds the upper limit value for any of one or more storage devices that include the storage area corresponding to the target candidate, the process shown in FIG. 14 proceeds to step S338. Otherwise, the process proceeds to step S340 described above.

In step S338, the system RAID group management program 142 determines that the use of the target candidate is restricted. Specifically, it is determined that the use of the storage area corresponding to the target candidate as an additional real volume is restricted by the upper limit value regarding the number of active RAID groups. At this time, the system RAID group management program 142 updates the candidate management table 136. Specifically, the flag for the target candidate is set to "0".

In step S342, it is determined whether or not determination is completed for all candidates registered in the candidate management table 136. If determination as to all candidates is not completed, the process returns to step S332 and the process shown in FIG. 14 is executed repeatedly. If determination as to all candidates is completed, the process shown in FIG. 14 (i.e., the operation of step S310 shown in FIG. 11) ends and the operation of step S312 of FIG. 11 is executed.

The candidate management table 136' shown in FIG. 13 above is created through the process executed in FIG. 14. For example, the flag for the candidate number "3" is set to "1" in FIG. 13. This is done because the activation of the RAID groups "01", "02" in the "Storage device B" is not restricted by the applicable upper limit value. The flag for the candidate number "4" is set to "0". This is done because while the RAID group "02" in the "Storage device A" is already active, activation of the RAID group "03" in the "Storage device A" is restricted by the applicable upper limit value. Furthermore, the flag for the candidate number "5" is set to "1". This is done because the RAID group "02" in the "Storage device A" is already active, and activation of the RAID group "01" in the "Storage device B" is not restricted by the applicable upper limit value.

As described above, if the process of FIG. 11 (and FIG. 14) is executed, where the actual remaining capacity of the virtual volume becomes small, the actual capacity and the actual remaining capacity of the virtual volume can be quickly increased.

The situation is described with reference to FIG. 11 (and FIG. 14) in which a real volume is already mapped to a virtual volume and a different real volume is added and mapped to the virtual volume. However, the process of FIG. 11 can also be carried out where a real volume is to be initially mapped to a virtual volume. In this case, the process of steps S308-S316 in FIG. 11 should be executed.

As described above, employing this embodiment, a real volume on a storage device 200 can be quickly mapped to a virtual volume on the virtualization device 100. Specifically, the system RAID group management program 142 selects a plurality of candidates corresponding to a plurality of storage areas that can be used to create a real volume while ensuring that the number of active RAID groups does not exceed the upper limit value. As a result, by using one candidate selected from among the plurality of candidates, a real volume can be quickly created and mapped to a virtual volume.

In this embodiment, because a storage area that can be used to create an additional real volume satisfying the additional real volume conditions is selected as a candidate, an additional real volume having the optimal size and RAID level can be easily created and mapped to a virtual volume.

As can be understood from the above explanation, the virtualization device 100 of this embodiment corresponds to a management apparatus of the present invention. Specifically, the virtualization program 122 corresponds to a virtualization module, the system RAID group management program 142 corresponds to a management data obtaining module, and the AOU program 132 and system RAID group management program 142 together correspond to a processing executor. In addition, the AOU program 132 and system RAID group management program 142 corresponds to a candidate selection module, and the AOU program 132 corresponds to a creation instruction module, a utilization rate obtaining module and a candidate determination module.

In this embodiment, the system RAID group management program 142 and system RAID group management table 144 are disposed on the virtualization device 100, but they may instead be disposed on a different device, such as the storage devices 200 or the management server 400. In this case, the virtualization device and the other device is equivalent to a management apparatus of the present invention.

In this embodiment, a management server 400 is provided, but it may be omitted. In this case, the functions of the management server 400 may be executed by a different device such as the virtualization device 100 or the storage devices 200.

Furthermore in this embodiment, the virtualization device 100 is used, but a switch (virtualization switch) having the functions of the virtualization device may be used instead.

B. Second Embodiment

Figure 15:
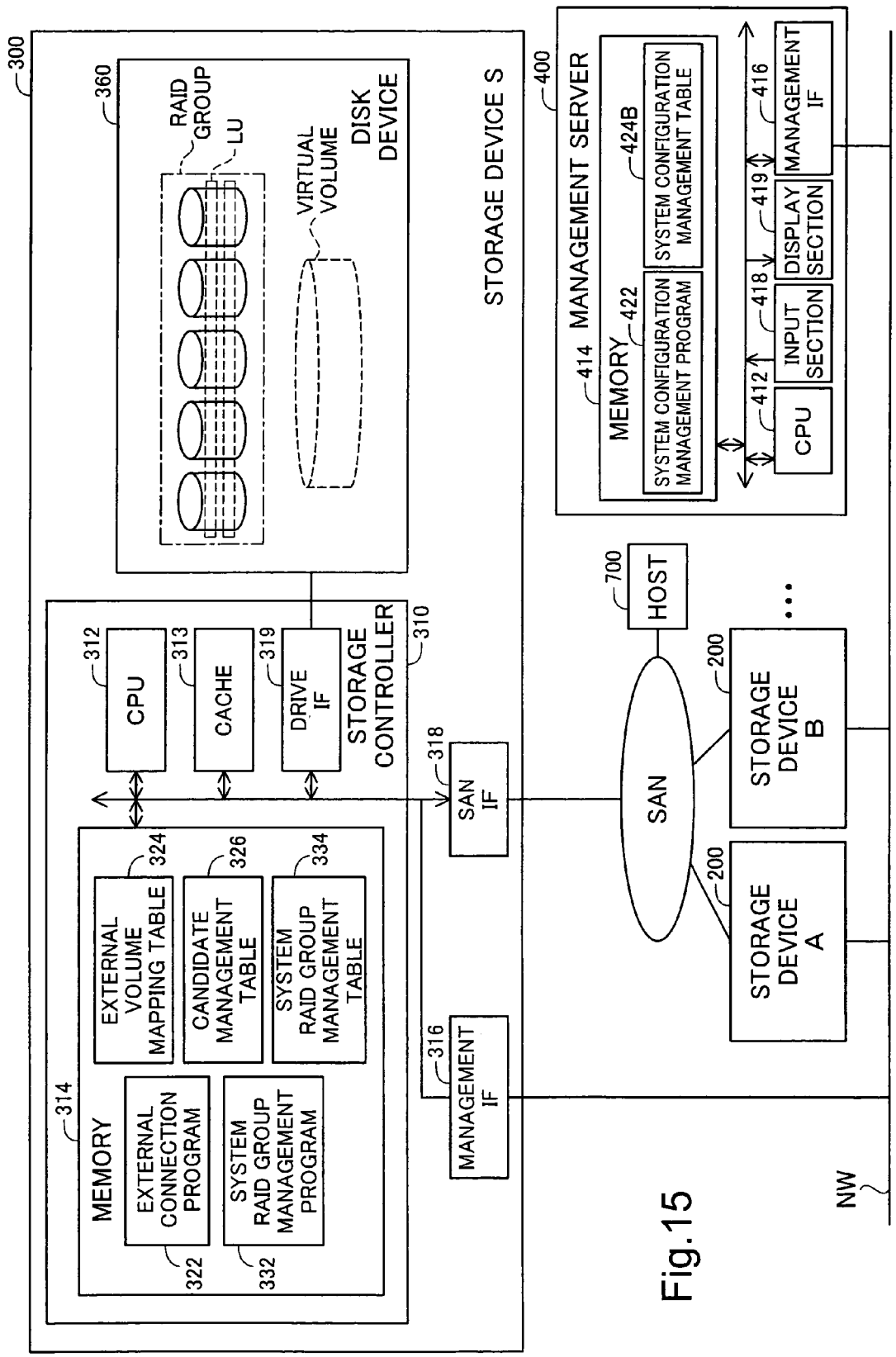
FIG. 15 shows the basic configuration of a network system of a second embodiment.

B-1. Network System Configuration:

FIG. 15 shows the basic configuration of a network system of a second embodiment. In this embodiment, in comparison with the first embodiment (FIG. 1), the virtualization device 100 is omitted, and a storage device 300 having external connection function is added. The storage device 300 is connected to the SAN and to the management network NW.

As described below, a virtual volume is created on the storage device 300 having external connection function, and a logical volume on a different storage device 200 (hereinafter "external volume") is mapped to the virtual volume. As a result, the host 700 can access a logical volume (internal volume) that is actually included in the storage device 300, and can access an external volume on the storage devices 200 by accessing the virtual volume on the storage device 300 without consciousness of the storage device 200.

In the discussion below, the storage device 300 having external connection function is also termed an "advanced storage device".

B-1-1. Storage Device Configuration:

The storage devices 200 [of this embodiment] are identical to the storage devices 200 of the first embodiment (FIG. 2).

B-1-2. Management Server Configuration:

The management server 400 is substantially the same as the management server 400 of the first embodiment (FIG. 1), except for that the system configuration management table 424B is different.

FIG. 16 shows the contents of the system configuration management table 424B. As seen in the drawing, in the system configuration management table 424B, the items of "Device name", "Model", "LU_ID", "RAID group number (#) (RAID level)", "Size" and "Used size" are registered for each logical volume, as in FIG. 4.

In the first embodiment, a logical volume (additional real volume) is created in an unassigned area of a storage device 200 and the created logical volume is mapped to a virtual volume. On the other hand, in this embodiment, a logical volume (external volume) already created in a storage device 200 is mapped to a virtual volume on the advanced storage device 300 having external connection function. Therefore, FIG. 16 shows no unassigned areas. In FIG. 16, only external volumes in a "Storage device A" and a "Storage device B" corresponding to two storage devices 200 are shown, but in actuality, internal volumes in a "Storage device S" corresponding to the advanced storage device 300 are also registered in the system configuration management table 424B.

B-1-3. Advanced Storage Device Configuration:

The advanced storage device 300, like the storage device 200 shown in FIG. 2, comprises a storage controller 310, a disk device 360, a management IF 316 and a SAN IF 318.

The disk device 360, like the disk device 260 shown in FIG. 2, includes a number of hard disks. A plurality of RAID groups are configured in the disk device 360, and one or more logical volumes (internal volumes) are configured in each RAID group.

Furthermore, one or more virtual volumes are configured in the disk device 360, and a logical volume (external volume) of the other storage device 200 is mapped to each virtual volume.

The storage controller 310, like the storage controller 210 shown in FIG. 2, comprises a CPU 312, a cache 313, a memory 314 and a drive IF 319.

The memory 314, like the memory 214 shown in FIG. 2, stores a RAID group control program, a RAID group management table, a monitoring agent, an I/O control program, a configuration management program and a configuration management table (not shown in the drawing). The RAID group control program manages the RAID groups established in the advanced storage device 300 using the RAID group management table.

The memory 314 further stores an external connection program 322, an external volume mapping table 324, a candidate management table 326, a system RAID group management program 332 and a system RAID group management table 334.

The system RAID group management program 332 executes similar processing with the system RAID group management program 142 of the virtualization device 100 in the first embodiment (FIG. 1).

The external connection program 322 creates a virtual volume, maps a logical volume (external volume) on each storage device 200 to the virtual volume, and manages the virtual volume. The external connection program 322 creates and updates the external volume mapping table 324 that shows the associations between a virtual volume and an external volume.

FIG. 17 shows the contents of the external volume mapping table 324. As shown in the drawing, in the external volume mapping table 324, the "Device name" and "Virtual volume ID" regarding the advanced storage device 300 and "Device name" and "LU_ID" regarding the other storage devices are registered for each virtual volume. "Virtual volume ID" indicates the identification number of a virtual volume on the advanced storage device 300, while "LU_ID" indicates the identification number of a logical volume (external volume) on the other storage device 200.

In FIG. 17, the external volume "01" of the "Storage device A" is mapped to the virtual volume "001" on the "Storage device S", and the external volume "02" of the "Storage device A" is mapped to the virtual volume "002" on the "Storage device S".

In addition, the external connection program 322 (FIG. 15) creates the candidate management table 326 using the system configuration management table 424B (FIG. 16) and the external volume mapping table 324 (FIG. 17) when an external volume is mapped to a virtual volume.

Figure 18:
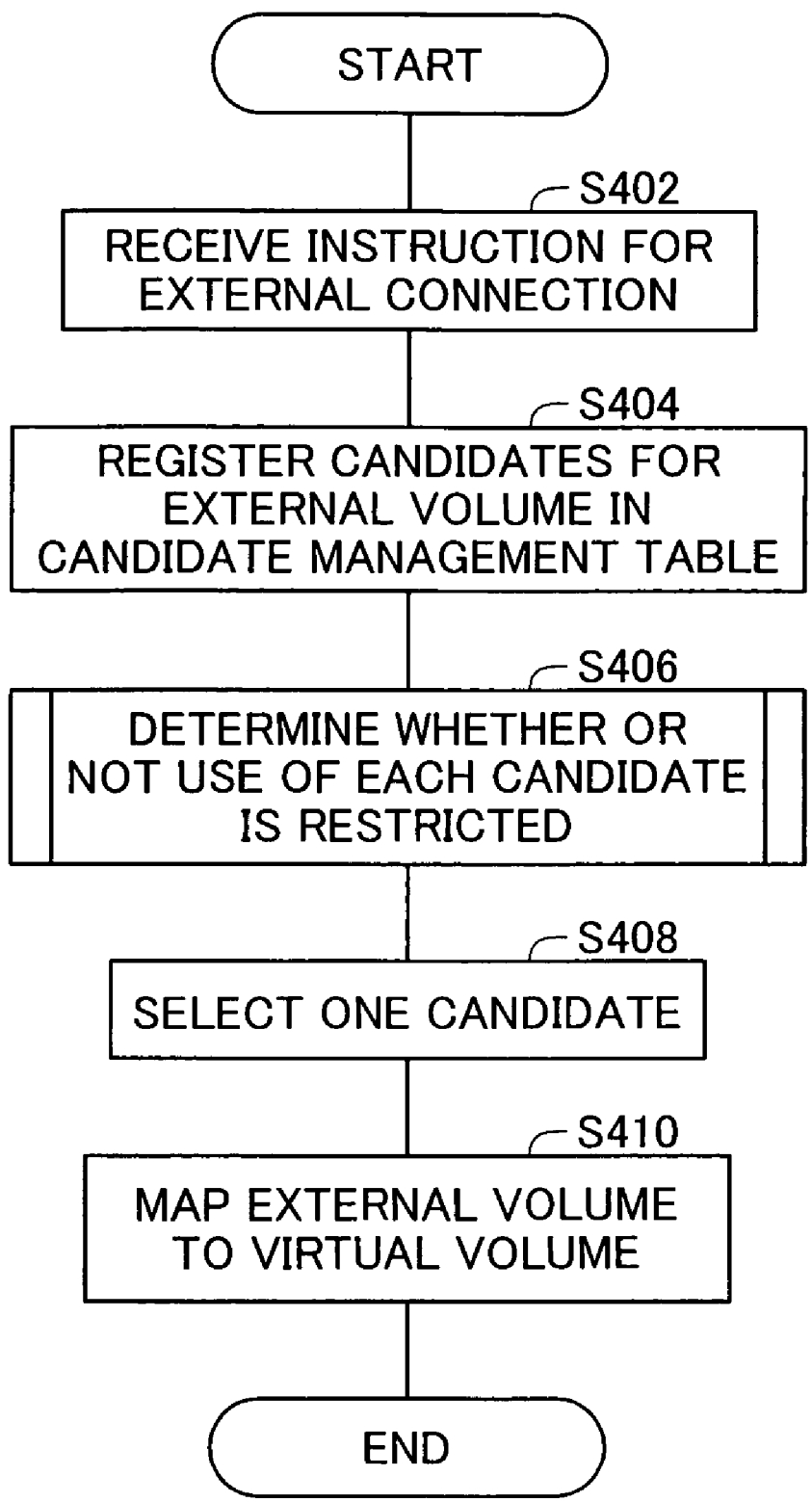
FIG. 18 is a flow chart showing the sequence of operations executed during mapping of an external volume to a virtual volume.

B-2. Mapping of External Volume to Virtual Volume:

FIG. 18 is a flow chart showing the sequence of operations executed during mapping of an external volume to a virtual volume. The process of FIG. 18 is executed in cooperation with the external connection program 322 and the system RAID group management program 332 of the advanced storage device 300 (FIG. 15).

In step S402, the external connection program 322 receives an instruction to initiate an external connection from an administrator. Specifically, the administrator operates the management server 400 to instruct the external connection program 322 of the advanced storage device 300 to initiate an external connection. Here, "initiating an external connection" means to the mapping of an external volume of the other storage device 200 to a virtual volume on the advanced storage device 300. If a virtual volume to which the external volume is to be mapped has already been created on the advanced storage device 300, the administrator specifies the ID of that virtual volume in step S402. Conversely, if a virtual volume to which the external volume is to be mapped has not already been created on the advanced storage device 300, the administrator instructs that a new virtual volume be created.

In step S404, the external connection program 322 selects candidates for the external volumes that can be mapped to the virtual volume with reference to the system configuration management table 424B (FIG. 16) and the external volume mapping table 324 (FIG. 17), and generates the candidate management table 326 in which these candidates are registered.

FIG. 19 shows the contents of the candidate management table 326. As shown in the drawing, in the candidate management table 326, the items of "Device name", "LU_ID", "RAID group number (#)" and "Flag" are registered for each external volume. No significant values are registered in the "Flag" column yet. In FIG. 19, the external volume "03" belonging to the RAID group "02" of the "Storage device A" is registered to the candidate number "1", for example.

Of the plurality of external volumes registered in the system configuration management table 424B (FIG. 16), candidates for external volumes that are not registered in the external volume mapping table 324 (FIG. 17), i.e., that are not yet mapped to any virtual volume, are registered in the candidate management table 326.

For example, the external volume "03" of the "Storage device A" registered in the third row of the system configuration management table 424B in FIG. 16 is not mapped to any virtual volume in the external volume mapping table 324 of FIG. 17. Therefore, the information pertaining to that external volume is registered in the candidate management table 326 as the candidate number "1" in FIG. 19.

In step S406, the system RAID group management program 332 determines, using the system RAID group management table 334 (see FIG. 7), whether or not the use of each candidate is restricted, according to an instruction from the external connection program 322. Specifically, it is determined whether or not the use of an external volume corresponding to each candidate is restricted by the upper limit value for the number of active RAID groups.

The operation of step S406 is executed in the same fashion as in FIG. 14. Specifically, each candidate is selected as a target candidate (step S332), and it is determined for each target candidate whether or not a RAID group must be newly activated (step S334), and whether or not the hypothetical number of active RAID groups due to the newly activation of a RAID group exceeds the upper limit value (step S336). Based on whether or not the use of the external volume corresponding to the target candidate is restricted by the upper limit value, a flag is set for each candidate in the candidate management table 326 in FIG. 19 and the candidate management table 326 is updated (steps S338, S340).

In step S408, according to a selection instruction from the administrator, the external connection program 322 selects one candidate from among the plurality of candidates in the updated candidate management table 326, the candidates being not subject to a use restriction.

Specifically, in step S408, the external connection program 322 supplies the administrator of the management server 400 with information regarding the candidate management table 326 updated in step S406, and selects one candidate based on the administrator's selection instruction issued via the management server 400. Note that, only candidates having a flag value of "1" may be displayed on the display section 419 of the management server 400, or all of the candidates may be displayed and classified according to flag value. When this is done, the management server 400 preferably displays the storage capacity and the amount of capacity used for the external volume corresponding to each candidate, using the system configuration management table 424B.

The external connection program 322 then causes the RAID group control program 222 of the storage device 200 to execute the process shown in FIG. 8. If a RAID group to which the external volume corresponding to the one candidate selected in step S408 belongs must be activated, the RAID group control program 222 activates that RAID group (step S108). However, because the use of the external volume is not restricted by the upper limit value (see step S406), the operations of steps S104, S106 in FIG. 8 are not carried out.

In step S410, the external connection program 322 maps the external volume corresponding to the one candidate selected in step S408 to the virtual volume specified or created in step S402. When the external volume is mapped to the virtual volume, the external connection program 322 updates the external volume mapping table 324.

In this embodiment, a virtual volume is specified or created in step S402, but a virtual volume may instead be specified or created in step S410 prior to mapping.

As described above, employing this embodiment, an external volume of a storage device 200 can be quickly mapped to a virtual volume on the advanced storage device 300. Specifically, the system RAID group management program 332 selects a plurality of candidates indicating a plurality of external volumes while ensuring that the number of active RAID groups does not exceed the upper limit value. As a result, by using one candidate selected from among the plurality of candidates, an external volume can be quickly mapped to a virtual volume.

In this embodiment, because an external volume that is not mapped to a different virtual volume is selected as a candidate, an appropriate logical volume can be easily mapped to a virtual volume.

In addition, if this embodiment is used and an advanced storage device 300 is added to the existing network system, the storage devices 200 can utilize the functions of the advanced storage device 300. For example, where the advanced storage device 300 has a large cache 313, the host 700 can write data at high speed to a virtual volume on the advanced storage device 300. Furthermore, where the storage devices 200 do not include a synchronous copying program but the advanced storage device 300 does include such a program, if a virtual volume is set as targets for synchronous copying, the external volumes of the storage devices 200 can be used as the synchronous copying targets.

As can be understood from the above discussion, the advanced storage device 300 of this embodiment corresponds to a management apparatus of the present invention. Specifically, the external connection program 322 corresponds to a virtualization module, the system RAID group management program 332 corresponds to a management data obtaining module, and the external connection program 322 and system RAID group management program 332 together correspond to a processing executor. Also, the external connection program 322 and system RAID group management program 332 together corresponds to a candidate selection module.

In this embodiment, one external volume is mapped to one virtual volume, as shown in FIG. 17, but two or more external volumes may be mapped to one virtual volume.

Furthermore, the system RAID group management program 332 and system RAID group management table 334 are disposed in the advanced storage device 300 in this embodiment, but they may instead be disposed in a difference device, such as the storage device 200 or the management server 400. In this case, the advanced storage device and such other device are together equivalent to a management apparatus of the present invention.

Moreover, a management server 400 is used in this embodiment, but it may be omitted. In this case, the functions of the management server 400 may be executed by a different device, such as the advanced storage device 300 or the storage device 200.

C. Third Embodiment

Figure 20:
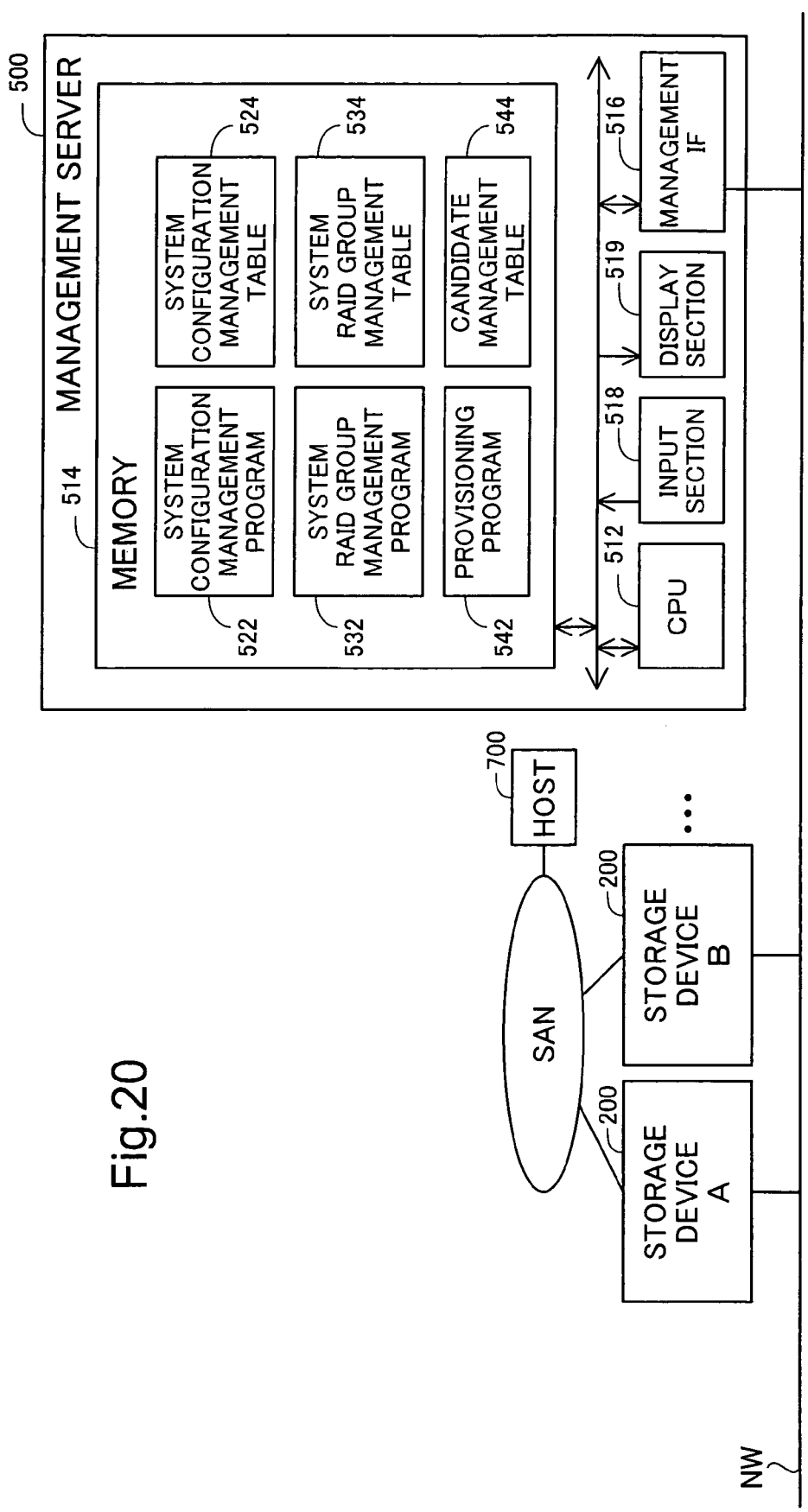
FIG. 20 shows the basic configuration of a network system of a third embodiment.

C-1. Network System Configuration:

FIG. 20 shows the basic configuration of a network system of a third embodiment. In this embodiment, in comparison with the first embodiment (FIG. 1), the virtualization device 100 is omitted and the management server 500 is different.

C-1-1. Storage Device Configuration:

The storage devices 200 of this embodiment are the same as the storage devices 200 of the first embodiment (FIG. 2).

C-1-2. Management Server Configuration:

The management server 500, like the management server 400 (FIG. 1) of the first embodiment, has a CPU 512, a memory 514, a management IF 516, an input section 518 and a display section 519.

The memory 514, like the memory 414 shown in FIG. 1, stores a system configuration management program 522 and a system configuration management table 524.

The memory 514 further stores a system RAID group management program 532, a system RAID group management table 534, a provisioning program 542 and a candidate management table 544.

The system configuration management program 522 executes similar processing with the system configuration management program 422 of the first embodiment (FIG. 1).

The system RAID group management program 532 executes similar processing with the system RAID group management program 142 (FIG. 1) of the virtualization device 100 of the first embodiment.

The provisioning program 542 instructs a storage device 200 to create a logical volume, according to an instruction from the administrator. At this time, the provisioning program 542 creates the candidate management table 544 (described below) using the system configuration management table 524 (see FIG. 4).

Figure 21:
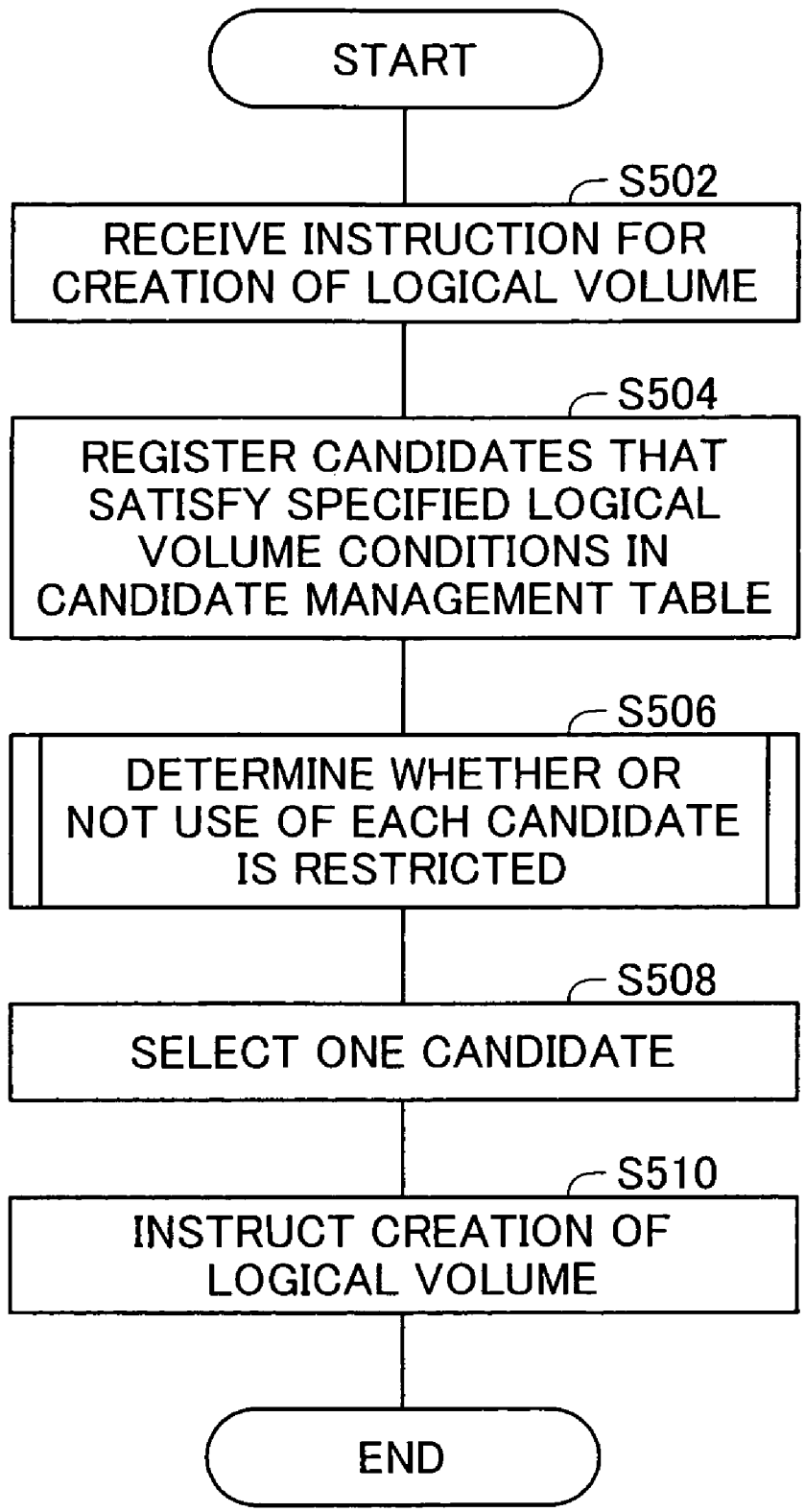
FIG. 21 is a flow chart showing the sequence of operations executed during creation of a logical volume.

C-2. Creation of Logical Volume:

FIG. 21 is a flow chart showing the sequence of operations executed during creation of a logical volume. The processing shown in FIG. 21 is executed in cooperation with the provisioning program 542 and the system RAID group management program 532 of the management server 500.

In step S502, the provisioning program 542 receives an instruction to create a logical volume from an administrator. Specifically, the administrator operates the management server 500 in order to instruct the provisioning program 542 to create a logical volume. At this time, the provisioning program 542 receives from the administrator the conditions for the logical volume to be created. The logical volume conditions may include the size and RAID level of a logical volume. For example, a size of 50 GB and a RAID level of 5 may be specified as the logical volume conditions.

In step S504, the provisioning program 542 selects, with reference to the system configuration management table 524 (see FIG. 4), candidates for storage areas, each of which can be used to create a logical volume that satisfies the logical volume conditions specified by the user (administrator), and creates a candidate management table 544 in which these candidates are registered.

FIG. 22 shows the contents of the candidate management table 544. As shown in the drawing, in the candidate management table 544, the items of "Device name", "RAID group number (#)" and "Flag" are registered for each RAID group. No significant values are registered in the "Flag" column yet. For example, in FIG. 22, the RAID group "03" of the "Storage device A" is registered as the candidate number "2".

The candidate management table 544 is created with reference to the system configuration management table 524 (see FIG. 4), as described above. Specifically, the information regarding the rows having an "unassigned" designation in the "LU_ID" field among the plurality of rows registered in the system configuration management table 524 is used as a reference. A plurality of candidates for storage areas that satisfy the logical volume conditions specified by the user are registered in the candidate management table 544.

For example, because the unassigned area belonging to the RAID group "03" of the "Storage device A" registered in the third row of FIG. 4 has a size of "80 G" bytes and a RAID level of "5", it satisfies the user-specified logical volume conditions (50 G, RAID5). Consequently, the information pertaining to the unassigned area in the third row is registered in the candidate management table 544 for the candidate number "2" in FIG. 22.

In this embodiment, a single storage area in a single RAID group in a single storage device is chosen as the storage area that can be used to create a logical volume. However, as described in connection with the first embodiment (FIG. 12), a storage area consisting of one or more partial storage areas in one or more RAID groups in one or more storage devices may also be selected as the storage area that can be used to create logical volume. Namely, a storage area consisting of a plurality of partial storage areas in a plurality of RAID groups in a single storage device may be selected, or a storage area consisting of a plurality of partial storage areas in a plurality of RAID groups in a plurality of storage devices may be selected. However, as in this embodiment, a storage area consisting of two or more partial storage areas in one or more storage devices may not be selected.

In step S506 (FIG. 21), the system RAID group management program 142 determines, using the system RAID group management table 534 (see FIG. 7), whether or not the use of each candidate is restricted, according to an instruction from the provisioning program 542. Specifically, it is determined whether or not the use of the storage area corresponding to each candidate is restricted by the upper limit value for the number of active RAID groups.

The operation of step S506 is executed in the same manner as in FIG. 14. Specifically, each candidate is selected as a target candidate (step S332), and it is determined for each target candidate whether or not a RAID group must be activated (step S334), and whether or not the hypothetical number of active RAID groups due to the newly activation of a RAID group exceeds the upper limit value (step S336). Based on whether or not the use of the storage area corresponding to the target candidate is restricted by the upper limit value, a flag is set for each candidate in the candidate management table 544 (FIG. 22) and the candidate management table 544 is updated (steps S338, S340).

In step S504, where a storage area consisting of two or more partial storage areas in one or more storage devices may be selected as a storage area candidate that can be used to create logical volumes, the determination of steps S334 and S336 may be carried out using the method described in connection with the first embodiment. Specifically, it may be determined in step S334 for each storage device and for each partial storage area whether or not activation of a RAID group is necessary, and it may be determined in step S336 for each storage device whether or not the hypothetical number of active RAID groups exceeds the upper limit value.

In step S508, according to a selection instruction from the administrator, the provisioning program 542 selects one candidate from among the plurality of candidates in the updated candidate management table 544, the candidates being not subject to a use restriction.

Specifically, in step S508, the provisioning program 542 supplies the administrator with information regarding the candidate management table 544 updated in step S506, and selects one candidate based on the administrator's selection instruction. Note that, only candidates having a flag value of "1" may be displayed on the display section 519 of the management server 500, or all of the candidates may be displayed and classified according to flag value.

In this embodiment, the provisioning program 542 is used by the administrator, but where it is used by multiple users (administrators), the display of candidates may vary depending on the user. For example, if it is used by a user of a first group, candidates whose flag is "0" and "1" may be displayed, while if it is used by a user of a second group, only candidates whose flag is "1" may be displayed. Furthermore, the display of candidates may be varied depending on the storage device. For example, if candidates for storage areas belong to the storage device A, candidates whose flag is "0" and "1" may be displayed, while if candidates for storage areas belong to the storage device B, only candidates whose flag is "1" may be displayed.

In this embodiment, the provisioning program 542 selects one candidate based on the administrator's selection instruction, but instead of this, one optimal candidate may be selected based on predetermined selection rules, as described in connection with the first embodiment (specifically, in connection with step S312 in FIG. 11).

In step S510, the provisioning program 542 instructs the storage device 200 that includes the storage area (unassigned area) corresponding to the one candidate selected in step S508 to create a logical volume.

When this is done, the RAID group control program 222 of the storage device 200 executes the process shown in FIG. 8, and if a RAID group to which the storage area (unassigned area) selected in step S508 belongs must be newly activated, activates that RAID group (step S108). However, because the use of this storage area (unassigned area) is not restricted by the upper limit value (see step S506), the operations of steps S104, S106 in FIG. 8 are not executed.

The configuration management program 252 of the storage device 200 then creates a logical volume in the storage area (unassigned area) selected in step S508 and assigns an identification number (LU_ID) thereto. The size of the created logical volume is the size determined by the specified logical volume condition (50 GB). Contemporaneously with the creation of the logical volume, the configuration management table 254 is updated by the configuration management program 252, and the system configuration management table 524 is updated by the system configuration management program 522 of the management server 500.

As described above, employing this embodiment, the management server 500 can quickly create a logical volume on a storage device 200. Specifically, the system RAID group management program 532 selects a plurality of candidates indicating a plurality of storage areas that can be used to create a logical volume while ensuring that the number of active RAID groups does not exceed the upper limit value regarding. As a result, by using one candidate selected from among the plurality of candidates, a logical volume can be quickly created.

In addition, because storage areas that can be used to create a logical volume and that satisfy the user-specified logical volume conditions are selected as candidates in this embodiment, a logical volume having the desired size and RAID level can be easily created.

As can be understood from the above description, the management server 500 of this embodiment corresponds to a management apparatus of the present invention. Specifically, the system RAID group management program 532 corresponds to a management data obtaining module, and the provisioning program 542 and system RAID group management program 532 together correspond to a processing executor. Also, the provisioning program 542 and system RAID group management program 532 together corresponds to a candidate selection module, and the provisioning program 542 corresponds to a creation instruction module.

The system RAID group management program 532 and system RAID group management table 534 are disposed on the management server 500 in this embodiment, but they may instead be disposed on a different device, such as on the storage device 200. In this case, the management server and such other device are together equivalent to a management apparatus of the present invention.

The system RAID group management program 532 and system RAID group management table 534 are disposed on the management server 500 in this embodiment, but where the virtualization device 100 is used in the same manner as in the first embodiment, they may be disposed on the virtualization device 100. In this case, the management server and virtualization device are together equivalent to a management apparatus of the present invention.

D. Fourth Embodiment

Figure 23:
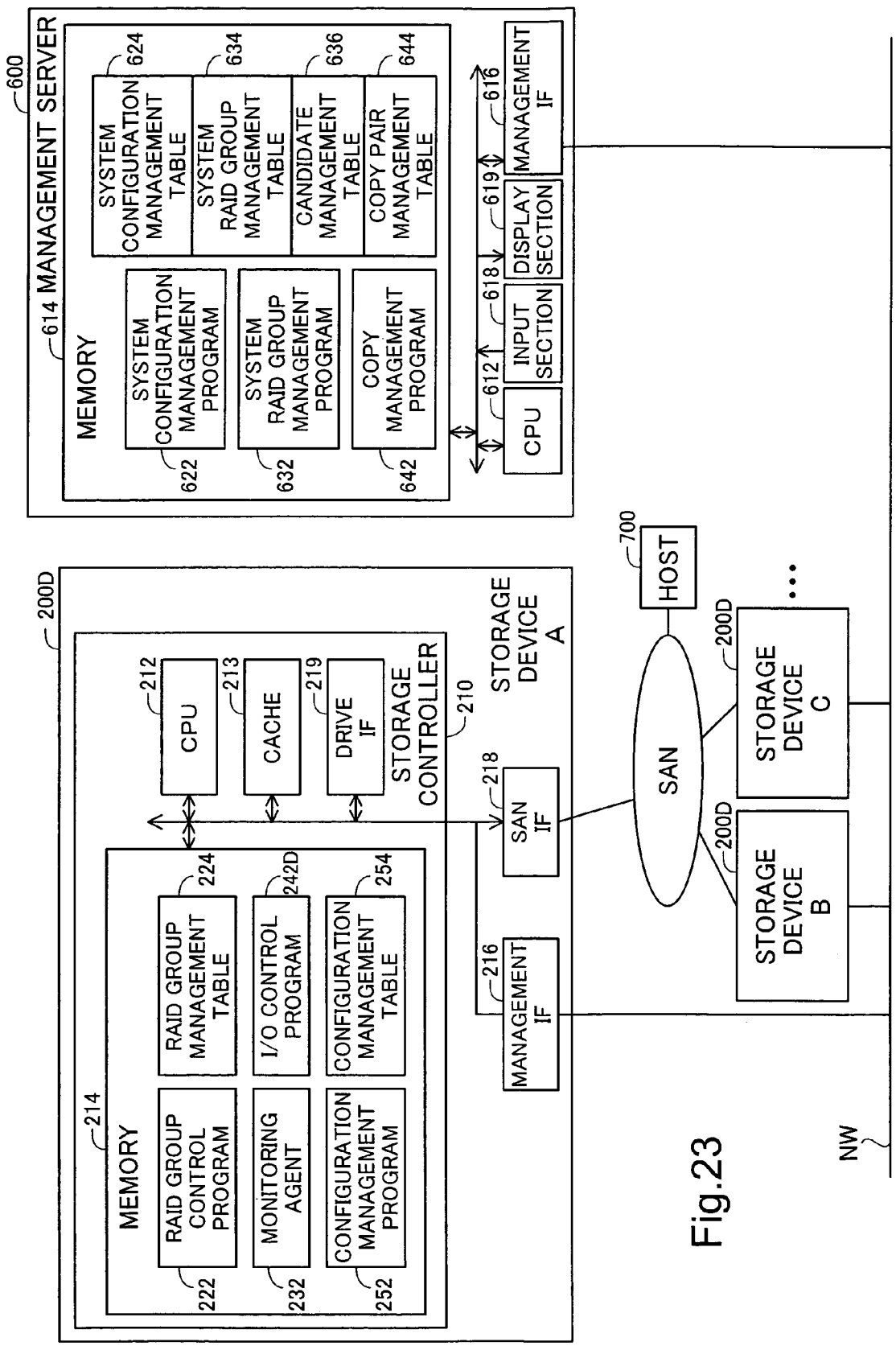
FIG. 23 shows the basic configuration of a network system of a fourth embodiment.

D-1. Network System Configuration:

FIG. 23 shows the basic configuration of a network system of a fourth embodiment. In this embodiment, in comparison with the first embodiment (FIG. 1), the virtualization device 100 is omitted, and the plurality of storage devices 200D and the management server 600 are modified.

D-1-1. Storage Device Configuration:

The storage devices 200D are substantially the same as the storage devices 200 of the first embodiment (FIG. 2), but the I/O control program 242D is modified. The processing executed by the I/O control program 242D is described below. Note that, in FIG. 23, the illustration of the disk device 260 is omitted for the sake of convenience.

D-1-2. Management Server Configuration:

The management server 600, like the management server 400 of the first embodiment (FIG. 1), comprises a CPU 612, a memory 614, a management IF 616, an input section 618 and a display section 619.

The memory 614, like the memory 414 shown in FIG. 1, stores a system configuration management program 622 and a system configuration management table 624.

The memory 614 further stores a system RAID group management program 632, a system RAID group management table 634, a candidate management table 636, a copy management program 642 and a copy pair management table 644.

The system configuration management program 622 executes similar processing with the system configuration management program 422 (FIG. 1) of the first embodiment.

The system RAID group management program 632 executes similar processing with the system RAID group management program 142 (FIG. 1) of the virtualization device 100 of the first embodiment. However, in this embodiment, the system RAID group management program 632 also executes other processing as described below.

The copy management program 642 manage the copy relationship between two logical volumes (termed "copy pair") using the copy pair management table 644.

FIG. 24 shows the contents of the copy pair management table 644. As shown in the drawing, the copy source "Device name" and "LU_ID" and the copy destination "Device name" and "LU_ID" are registered for each copy pair in the table 644. In FIG. 24, with respect to the first copy pair, the logical volume "01" of the "Storage device A" is set as the copy source and the logical volume "02" of the "Storage device B" is set as the copy destination, for example. With respect to the second copy pair, the logical volume "02" of the "Storage device A" is set as the copy source and the logical volume "03" of the "Storage device A" is set as the copy destination.

As described above, in this embodiment, the copy management program 642 manages copy relationships between two logical volumes on two different storage devices, as well as copy relationships between two logical volumes on the same storage device.

In this embodiment, so-called synchronous copying is carried out within copy pairs, such that the same data is stored on both of the copy source logical volume and the copy destination logical volume.

Figure 25:
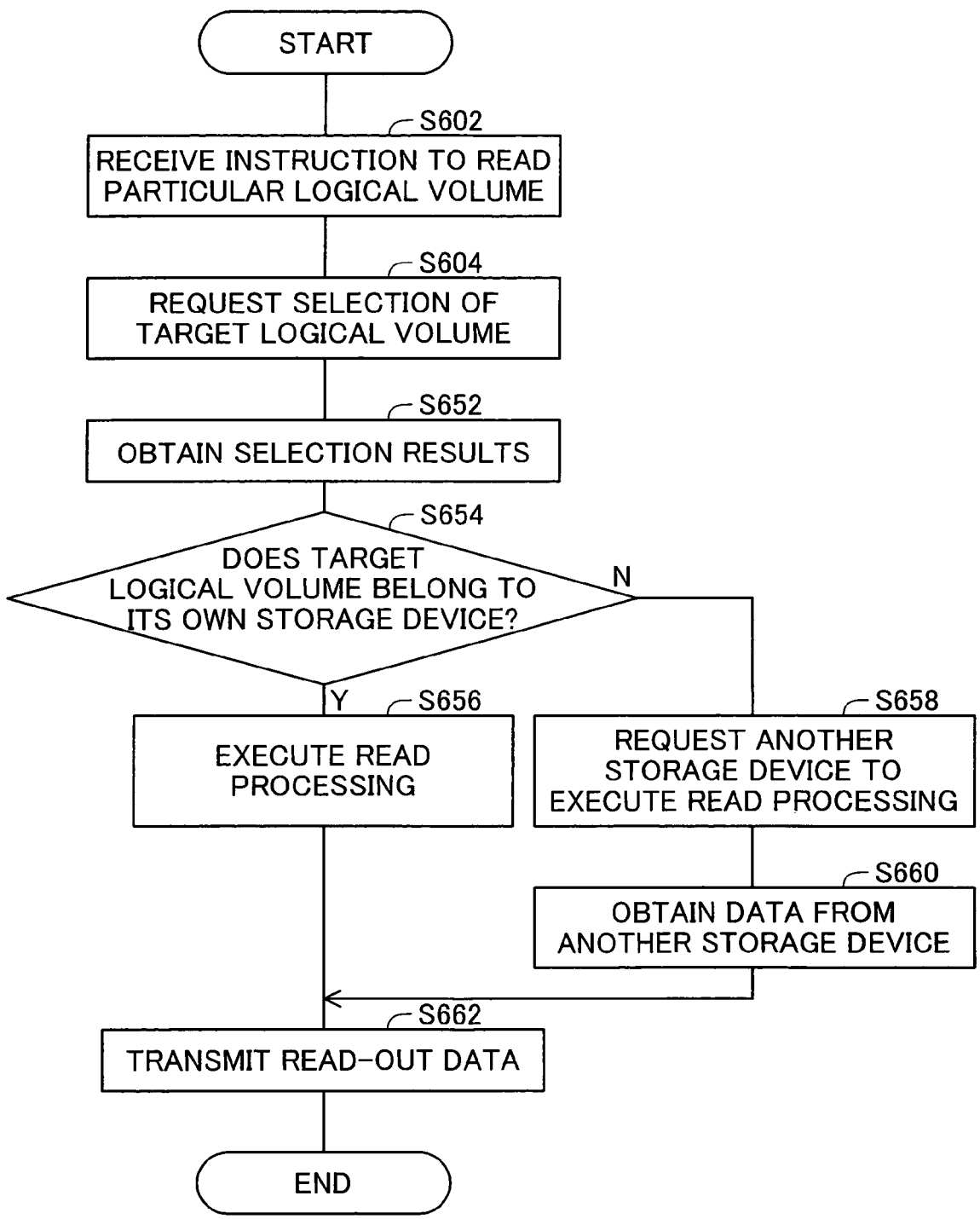
FIGS. 25 and 26 are flow charts showing the sequence of operations executed if a read request with regard to a copy source logical volume is issued.
Figure 26:
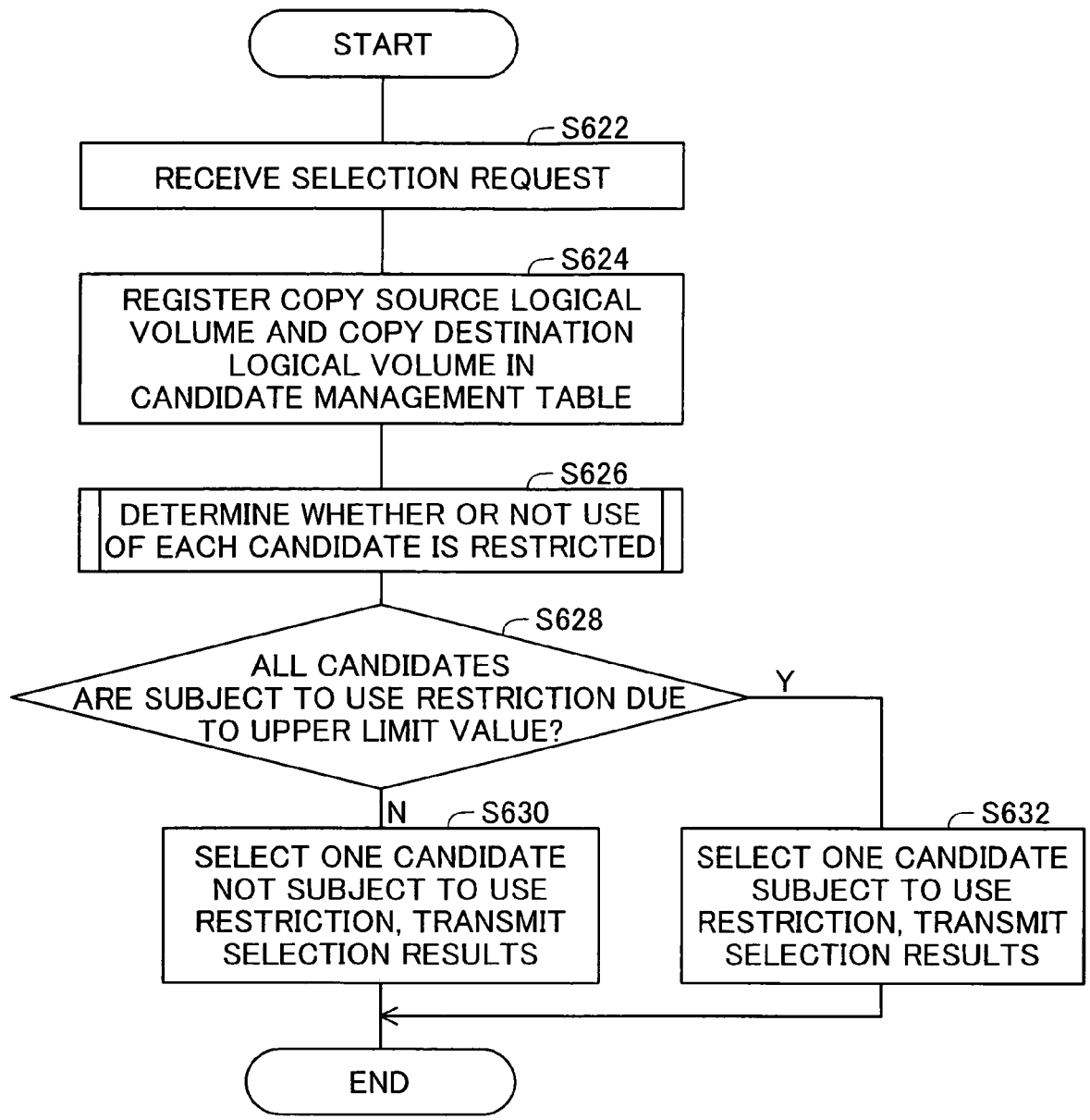

D-2. Read Processing:

FIGS. 25 and 26 are flow charts showing the sequence of operations executed if a read request with regard to a copy source logical volume is issued. The process shown in FIG. 25 is executed by the I/O control program 242D of the storage device 200D that contains the copy source logical volume, while the process shown in FIG. 26 is executed by the system RAID group management program 632 of the management server 600.

In step S602 in FIG. 25, the I/O control program 242D of the storage device 200D receives a read request pertaining to a particular logical volume (copy source logical volume) from the host 700. In the discussion below, the particular logical volume specified by the host 700 is also termed the "specified logical volume".

In step S604, the I/O control program 242D asks the system RAID group management program 632 of the management server 600 to select a logical volume to be the target of actual reading. In the discussion below, the logical volume to be the target of actual reading is also termed the "target logical volume".

Note that, the operations executed in steps S652-S662 of FIG. 25 will be described below.

In step S622 in FIG. 26, the system RAID group management program 632 of the management server 600 receives a request asking it to select a target logical volume (see step S604), and receives information regarding a specified logical volume from the I/O control program 242D of the storage device 200D. This information includes the device name of the storage device to which the specified logical volume belongs and the identification number (LU_ID) of the specified logical volume.

In step S624, the system RAID group management program 632 registers candidates for target logical volumes in the candidate management table 636 with reference to the copy pair management table 644. Specifically, the copy source logical volume that is the specified logical volume and the copy destination logical volume that holds the same data as the specified logical volume are registered.

FIG. 27 shows the contents of the candidate management table 636. As shown in the drawing, two logical volumes constituting one copy pair are registered in the table 636. Specifically, the items of "Device name", "LU_ID", "RAID group number (#)" and "Flag" are registered for each logical volume. No significant values are registered in the "Flag" column yet.

In FIG. 27, the logical volume "01" belonging to the RAID group "01" in the "Storage device A", which is the copy source logical volume, is registered as the candidate number "1". The logical volume "02" belonging to the RAID group "02" in the "Storage device B", which is the copy destination logical volume, is registered as the candidate number "2". Each RAID group number (#) is registered with reference to the system configuration management table 624 (see FIG. 16).

In step S626 (FIG. 26), the system RAID group management program 632 determines, with reference to the system RAID group management table 534 (see FIG. 7), whether or not the use of each candidate is restricted. Specifically, it is determined whether or not the use of the logical volume corresponding to each candidate is restricted by the upper limit value for the number of active RAID groups.

The operation of step S626 is executed in the same manner as in FIG. 14. Specifically, each candidate is selected as a target candidate (step S332), and it is determined for each target candidate whether or not a RAID group must be activated (step S334), and whether or not the hypothetical number of active RAID groups due to the newly activation of a RAID group exceeds the upper limit value (step S336). Based on whether or not the use of the storage area corresponding to the target candidate is restricted by the upper limit value, a flag is set for each candidate in the candidate management table 636 (see FIG. 27), and the candidate management table 636 is updated (steps S338, S340).

In step S628, the system RAID group management program 632 determines whether or not a flag of "0" is set for all candidates, i.e., whether or not the logical volumes corresponding to all candidates are subject to a use restriction.

If at least one of the candidates is not subject to a use restriction due to the upper limit value, the process proceeds to step S630. If all candidates are subject to a use restriction due to the upper limit value, however, the process proceeds to step S632.

In step S630, the system RAID group management program 632 selects one candidate that is not subject to a use restriction, and transmits the selection results to the I/O control program 242D of the storage device 200D that includes the specified logical volume. The selection results include information pertaining to the target logical volume corresponding to the selected candidate, i.e., the device name of the storage device to which the target logical volume belongs and the identification number (LU_ID) of the target logical volume.

In this embodiment, in step S630, if all of the candidates are not subject to a use restriction, the copy source logical volume is selected as the target logical volume preferentially. However, instead of this, the copy destination logical volume may be selected as the target logical volume preferentially.

In step S630, if all of the candidates are not subject to a use restriction, and if the use of a first logical volume (the copy source logical volume, for example) requires the newly activation of a RAID group while the use of a second logical volume (the copy destination logical volume, for example) does not require the newly activation of a RAID group, the second logical volume (the copy destination logical volume, for example) may be selected as the target logical volume preferentially. However, in this case, it is preferred that the value of the flag for each candidate is changed based on whether the newly activation of a RAID group is required for that candidate. For example, it is preferred that the flag is set to "2" if newly activation of a RAID group is not required, and the flag is set to "1" if newly activation of a RAID group is required. If this is done, a candidate that is not subject to a use restriction and indicates a logical volume that does not require newly activation of a RAID group can be easily selected, and the power consumption required for newly activation of a RAID group can be reduced.

In step S632, the system RAID group management program 632 selects one candidate that is subject to a use restriction, and transmits the selection results to the I/O control program 242D of the storage device 200D that includes the specified logical volume.

In this embodiment, in step S632, the copy source logical volume is selected as the target logical volume preferentially, but instead of this, the copy destination logical volume may be selected preferentially.

In step S652 in FIG. 25, the I/O control program 242D of the storage device 200D including the specified logical volume obtains the selection results (see steps S630, 632) from the system RAID group management program 632 of the management server 600.

In step S654, the I/O control program 242D determines whether or not the selected target logical volume belongs to its own storage device. This determination is made using the device name included in the obtained selection results.

If the target logical volume belongs to its own storage device, the process shown in FIG. 25 proceeds to step S656. On the other hand, if the target logical volume does not belong to its own storage device, i.e., if it belongs to a different storage device, the process proceeds to step S658.

In step S656, the I/O control program 242D executes read processing with regard to the target logical volume that belongs to its own storage device. When this occurs, the process shown in FIG. 8 is executed by the RAID group control program 222.

As described in connection with FIG. 8, if the use of the target logical volume is not restricted by the upper limit value, the RAID group control program 222 allows the I/O control program 242D to execute read processing. If the use of the target logical volume is restricted by the upper limit value, on the other hand, the RAID group control program 222 instructs the I/O control program 242D to wait.

In step S658, the I/O control program 242D asks the I/O control program 242D of a different storage device 200D to execute read processing with regard to the target logical volume belonging to the different storage device 200D. When this occurs, the I/O control program 242D of the different storage device executes read processing with regard to the target logical volume. At this time, the process shown in FIG. 8 is executed by the RAID group control program 222 of the different storage device 200D.

In step S660, the I/O control program 242D obtains the data read from the target logical volume from the different storage device 200D.

In step S662, the I/O control program 242D transmits the data read from the target logical volume to the host 700.

In this embodiment, information including the device name and identification number for the target logical volume is sent as selection results, but information regarding whether or not the target logical volume is subject to a use restriction may be sent as well. In this case, the process of FIG. 8 executed in steps S656, S658 may be simplified. Specifically, because if a use restriction does not exist, newly activation of a RAID group is not necessary or a RAID group can be immediately activated, the operations of steps S104, S106 in FIG. 8 can be omitted.

As described above, if a storage device receives 200D a read request asking for reading of a specified target logical volume from the host 700, it can send to the host 700 the data read from one of a copy source logical volume (a specified logical volume) included in itself and a copy destination logical volume included in itself or in a different storage device. As a result, the storage device 200D, even if read processing with regard to a copy source logical volume (the specified logical volume) included in itself cannot be immediately executed, can transmit to the host 700 data read from a copy destination logical volume included in itself or in a different storage device.

As described above, where a request to read data from a copy source logical volume is issued, this embodiment enables quick reading of that data. Specifically, the system RAID group management program 632 selects a copy source logical volume or a copy destination logical volume as a target logical volume while ensuring that the number of active RAID groups does not exceed the upper limit value. As a result, by executing read processing with regard to the target logical volume, data can be quickly read.

As can be understood from the above description, the management server 600 of this embodiment corresponds to a management apparatus of the present invention. Specifically, the system RAID group management program 632 corresponds to a management data obtaining module and a processing executor. The system RAID group management program 632 corresponds to a target logical volume selection module and a transmission module. Further, the I/O control program 242D of the storage device 200D corresponds to a controller.

In this embodiment, a situation in which identical data is stored on two different logical volumes is described, but identical data may be stored on three or more logical volumes. In this case, the three or more logical volumes may be registered in the candidate management table as candidates, and one target logical volume may be selected from among the three or more logical volume candidates. In general, one target logical volume will be selected from among a copy source logical volume and at least one copy destination logical volume.

E. Variations of Storage Device

Figure 28:
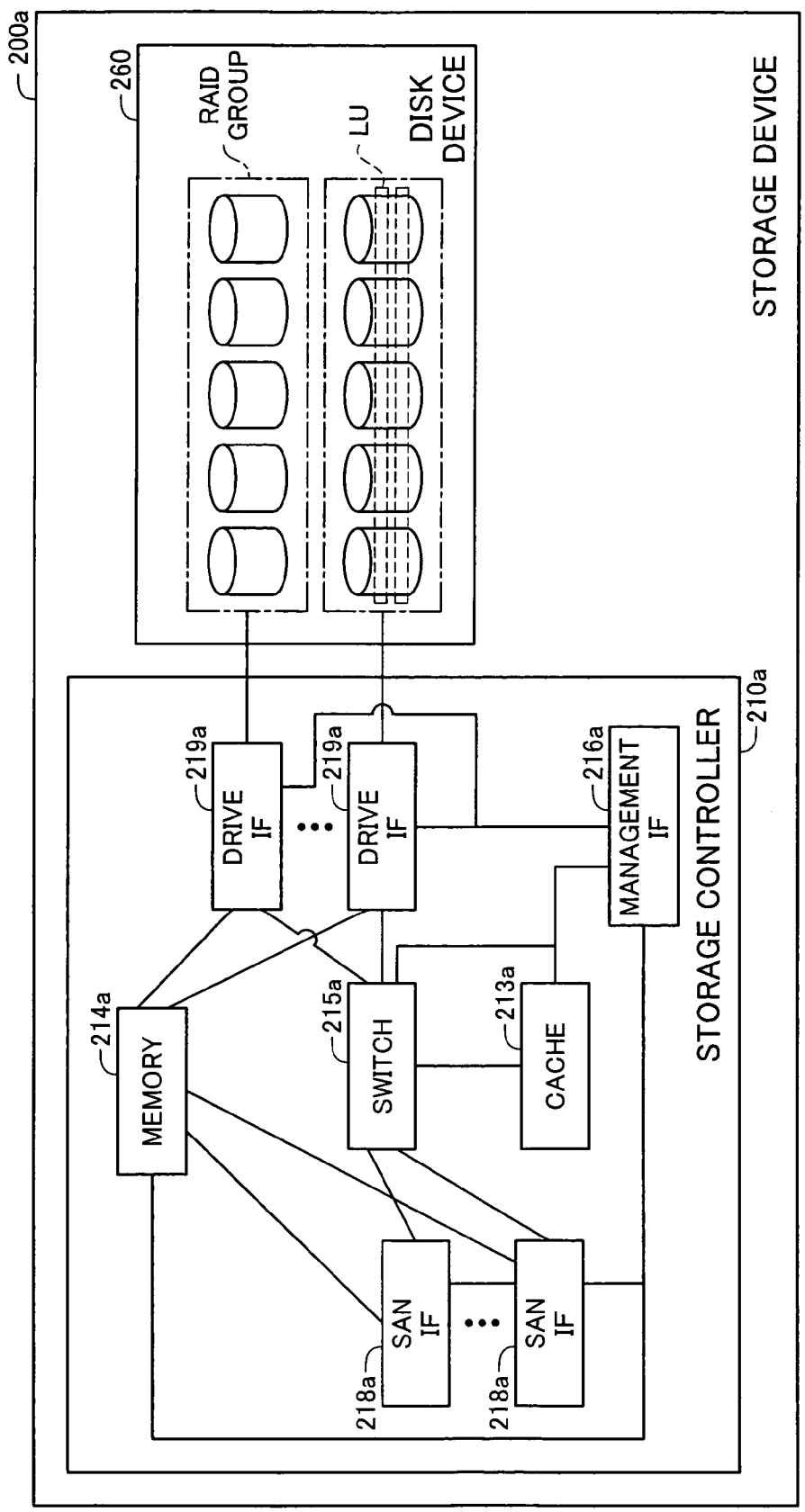
FIG. 28 shows a variation of the storage device of the first embodiment.

FIG. 28 shows a variation of the storage device of the first embodiment. The storage device 200a shown in FIG. 28 is similar with the storage device 200 shown in FIG. 2, but the storage controller 210a is modified. Specifically, the storage controller 210a includes a cache 213a, a memory 214a, a switch 215a, a management IF 216a, a plurality of SAN IFs 218a and a plurality of drive IFs 219a. Note that, in FIG. 28, the illustration of the memory 214a is simplified, but the memory 214a, like the memory 214, stores multiple programs. In addition, a CPU is provided in each SAN IF 218a and each drive IF 219a.

The management IF 216a is connected to the cache 213a, the memory 214a, the switch 215a, the plurality of SAN IFs 218a and the plurality of drive IFs 219a. Each SAN IF 218a is connected to the memory 214a and the switch 215a, and each drive IF 219a is connected to the memory 214a and the switch 215a.

As described above, each SAN IF 218a is connected to each drive IF 219a via the switch 215a, and the cache 213a is connected to the switch 215a. This configuration enables rapid data exchange between each SAN IF 218a and each drive IF 219a. In other words, the so-called "switch connection method" shown in FIG. 28 is used instead of the so-called "common bus method" shown in FIG. 2, data transfer can be speeded up.

Furthermore, using a plurality of SAN IFs 218a and a plurality of drive IFs 219a as shown in FIG. 28 offers the advantage that if a failure occurs in any of the interfaces, uninterrupted use of the storage device can be enabled by switching to a different interface.

In connection with FIG. 28, a situation in which the "switch connection method" is applied to the storage device 200 of the first embodiment (FIG. 2) is described, but the "switch connection method" may also be applied to the storage devices 200, 300, 200D (FIGS. 15, 20, 23) of the second through fourth embodiments.

The invention is not limited to the above examples and embodiments set forth hereinabove, and can be reduced to practice in various ways without departing from the spirit thereof, such as the following variations, for example.

(1) In the above embodiments, a plurality of storage devices 200, 200D are disposed in the network system, but at least one storage device may be disposed. In general, the management apparatus will manage at least one external storage device.

(2) In the above embodiments, the number of active RAID groups is managed, but the number of active groups not having a RAID configuration may be managed instead.

In general, predetermined processing may be executed such that a logical volume belonging to a disk group in a storage device is utilized while ensuring that the number of active disk groups in each storage device does not exceed an upper limit value.

(3) In the above embodiments, the system RAID group management program obtains from each storage device 200, 200D the number of active RAID groups, the active RAID group numbers (#) and the upper limit value (see FIG. 7). However, the number of active RAID groups need not be obtained. In this case, the number of active RAID groups may be sought from the number of active RAID group numbers (#). Furthermore, the upper limit value need not be obtained. In this case, an upper limit value may be set in advance for each storage device in the system RAID group management table, or an upper limit value common to all storage devices may be set in advance.

In the above embodiments, the system RAID group management program obtains the upper limit value from each storage device 200, 200D, but the maximum power consumption value set by the manufacturer may be obtained instead. In this case, the upper limit value should be determined in accordance with the maximum power consumption value for each storage device.

As can be understood from the above explanation, the active RAID group number (#) in the above embodiments corresponds to a management data of the present invention.

(4) In the above embodiments, both of a SAN and a management network NW are used, but a network system may be constructed using a SAN only or the management network NW only.

(5) In the above embodiments, part of the components realized by hardware may be instead realized by software, and part of the components realized by software may be instead realized by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A management apparatus that manages a storage device provided externally, comprising:
a management data obtaining module that obtains, while the storage device is in operation, management data indicating which of a plurality of disk groups in the storage device is active, from the storage device, wherein the plurality of disk groups comprises a RAID group including at least one logical volume, and wherein the management data indicates a number of active RAID groups, an active RAID group identification number, and an upper limit value indicating a number of RAID groups that are able to be active at any given point in time; and
a processing executor that executes, while the storage device is in operation, predetermined processing with reference to the management data regarding the storage device in order to utilize a logical volume belonging to a disk group in the plurality of disk groups in the storage device while ensuring that a number of active disk groups in the storage device does not exceed the upper limit value, wherein the processing executor determines, when one of the logical volumes in the RAID group is access or a new logical volume is set to be added to the RAID group, if activation of the RAID group is necessary and to determine if the activation would cause the upper limit value to be exceeded, wherein the process executor further sends a first instruction to the storage device indicating whether the upper limit value is exceeded and sends a second instruction to the storage device indicating that activation of the RAID group is necessary and to activate the RAID group, and wherein an activity of a disk group in the plurality of disk groups in the storage device is controlled dynamically.

2. A management apparatus according to claim 1, further comprising:

a virtualization module that maps a logical volume included in at least one storage device to a virtual volume, wherein the processing executor comprises:

a candidate selection module that, if a logical volume is to be mapped to the virtual volume, selects with reference to the management data regarding the at least one storage device a plurality of candidates indicating a plurality of storage areas, each storage area being included in the at least one storage device and being usable to create the logical volume to be mapped to the virtual volume, while ensuring that the number of active disk groups in each storage device does not exceed the upper limit value; and a creation instruction module that instructs a particular storage device including a storage area corresponding to one candidate selected from among the plurality of candidates to create a logical volume in the storage area corresponding to the one candidate, and wherein the virtualization module maps the created logical volume to the virtual volume.

3. A management apparatus according to claim 2, wherein the candidate selection module comprises:

a utilization rate obtaining module that obtains a utilization rate of storage capacity of the virtual volume, and wherein if the utilization rate exceeds a predetermined value, the candidate selection module selects the plurality of candidates in order to map anew logical volume to the virtual volume.

4. A management apparatus according to claim 3, wherein the candidate selection module selects as the candidate a storage area that is usable to create a logical volume satisfying a preset condition.

5. A management apparatus according to claim 2, wherein the candidate selection module is capable of selecting as the candidate a storage area including two or more partial storage areas included in the at least one storage device, and the storage area including the two or more partial storage areas is selected as the candidate if the number of active disk groups in each of the at least one storage device does not exceed the upper limit value.

6. A management apparatus according to claim 2, wherein the processing executor further comprises:

a candidate determination module that selects the one candidate from among the plurality of candidates based on a predetermined rule.

7. A management apparatus according to claim 1, further comprising:

a virtualization module that maps a logical volume included in at lease one storage device to a virtual volume, wherein the processing executor comprises:

a candidate selection module that, if a logical volume is to be mapped to the virtual volume, selects with reference to the management data regarding the at least one storage device a plurality of candidates indicating a plurality of logical volumes, each logical volume being included in the at least one storage device and being usable to be mapped to the virtual volume, while ensuring that the number of active disk groups in each storage device does not exceed the upper limit value, and wherein the virtualization module maps a logical volume corresponding to one candidate selected from among the plurality of candidates to the virtual volume.

8. A management apparatus according to claim 7, wherein the candidate selection module selects as the candidate a logical volume that is not mapped to other virtual volumes.

9. A management apparatus according to claim 1, wherein the processing executor comprises:

a candidate selection module that, if a logical volume is to be created in at least one storage device, selects with reference to the management data regarding the at least one storage device a plurality of candidates indicating a plurality of storage areas, each storage area being included in the at least one storage device and being usable to create the logical volume, while ensuring that the number of active disk groups in each storage device does not exceed the upper limit value; and a creation instruction module that instructs a particular storage device including a storage area corresponding to one candidate selected from among the plurality of candidates to create a logical volume in the storage area corresponding to the one candidate.

10. A management apparatus according to claim 9, wherein the candidate selection module selects as the candidate a storage area that is usable to create a logical volume satisfying a condition specified by a user.

11. A management apparatus according to claim 9, wherein the candidate selection module is capable of selecting as the candidate a storage area including two or more partial storage areas included in the at least one storage device, and the storage area including the two or more partial storage areas is selected as the candidate if the number of active disk groups in each of the at least one storage device does not exceed the upper limit value.

12. A management apparatus according to claim 9, wherein the processing executor further comprises:

a candidate determination module that selects the one candidate from among the plurality of candidates based on a predetermined rule.

13. A management apparatus according to claim 1, wherein at least one storage device include a copy source logical volume belonging to a first disk group and a copy destination logical volume belonging a second disk group that is different from the first disk group, and wherein the processing executor comprises:

a target logical volume selection module that, if a request for reading data from the copy source logical volume included in a particular storage device is issued, selects with reference to the management data regarding the at least one storage device as a target logical volume for reading one of the copy source logical volume and the copy destination logical volume, while ensuring that the number of active disk groups in each storage device does not exceed the upper limit value; and a transmission module that transmits information regarding the target logical volume to the particular storage device including the copy source logical volume.

14. A management apparatus according to claim 13, wherein the copy source logical volume and the copy destination logical volume are included in the particular storage device.

15. A management apparatus according to claim 13, wherein the copy source logical volume and the copy destination logical volume are included indifferent storage devices.

16. A management apparatus according to claim 13, wherein if both of the copy source logical volume and the copy destination logical volume are selectable as the target logical volume while ensuring that the number of active disk groups in each storage device does not exceed the upper limit value, the target logical volume selection module preferentially selects one logical volume that does not require a newly activation of a disk group.

17. A storage system comprising:
the management apparatus according to claim 13; and
the particular storage device,
wherein the particular storage device comprises:
a controller that obtains the information regarding the target logical volume from the management apparatus and executes processing in accordance with the information, and wherein the controller,
if the target logical volume is included in the particular storage device, executes read processing with regard to the target logical volume, and
if the target logical volume is included in a storage device different from the particular storage device, instructs the different storage device to execute read processing with regard to the target logical volume.

18. A method executed in a management apparatus for managing a storage device provided externally, comprising:
obtaining management data, while the storage device is operating, indicating which of a plurality of disk groups in the storage device is active, from the storage device, wherein the plurality of disk groups comprises a RAID group including at least one logical volume, and wherein the management data indicates a number of active RAID groups, an active RAID group identification number, and an upper limit value indicating a number of RAID groups that are able to be active at any given point in time;
executing predetermined processing, while the storage device is operating, with reference to the management data regarding the storage device in order to utilize a logical volume belonging to a disk group in the plurality of disk groups in the storage device while ensuring that a number of active disk groups in the storage device does not exceed the upper limit value, wherein the predetermined processing determines, when one of the logical volumes in the RAID group is access or a new logical volume is set to be added to the RAID group, if activation of the RAID group is necessary and further to determine if the activation would cause the upper limit value to be exceeded, wherein the predetermined processing further sends a first instruction to the storage device indicating whether the upper limit value is exceeded and sends a second instruction to the storage device indicating that activation of the RAID group is necessary and to activate the RAID group, and wherein activity of the disk group in the plurality of disk groups is controlled dynamically;
when a logical volume is to be mapped to a virtual volume, then selecting with reference to the management data regarding the at least one storage device a plurality of candidates indicating a plurality of storage areas, each storage area being included in the at least one storage device and being able to create the logical volume to be mapped to the virtual volume, while ensuring that the number of active disk groups in each storage device does not exceed the upper limit value;
instructing a particular storage device, including a storage area corresponding to one candidate selected from among the plurality of candidates, to create a logical volume in the storage area corresponding to the one candidate;
mapping the logical volume in the storage area to the virtual volume;
obtaining a utilization rate of storage capacity of the virtual volume;
selecting, when the utilization rate exceeds a predetermined value, the plurality of candidates in order to map a new logical volume to the virtual volume, wherein each of the plurality of candidates is usable without increasing the number of active disk groups beyond the upper limit value and wherein each of the plurality of candidates satisfies a condition preset by a user;
activating, in response to an access request requesting access to the logical volume, a particular disk group to which the requested logical volume belongs in a case where the particular disk group is not active and the particular disk group is capable of being activated without increasing the number of active disk groups beyond the upper limit value; and
postponing, in response to the access request, the activating of the particular disk group in a case where the particular disk group is not active and the particular disk group is not capable of being activated without increasing the number of active disk groups beyond the upper limit value.

19. A computer program product for causing a computer to manage a storage device provided externally, comprising:
a computer readable medium; and
a computer program stored on the computer readable medium,
wherein the computer program comprises:
a first program for causing the computer to obtain, while the storage device is operating, management data indicating which of a plurality of disk groups in the storage device is active, from the storage device, wherein the plurality of disk groups comprises a RAID group including at least one logical volume, and wherein the management data indicating a number of active RAID groups, an active RAID group identification number, and an upper limit value indicating a number of RAID groups that are able to be active at any given instant;
a second program for causing the computer to execute, while the storage device is operating, predetermined processing with reference to the management data regarding the storage device in order to utilize a logical volume belonging to a disk group in the plurality of disk groups in the storage device while ensuring that a number of active disk groups in the storage device does not exceed the upper limit value, wherein the predetermined processing determines, when one of the logical volumes in the RAID group is access or a new logical volume is set to be added to the RAID group, if activation of the RAID group is necessary and further to determine if the activation would cause the upper limit value to be exceeded, wherein the predetermined processing further sends a first instruction to the storage device indicating whether the upper limit value is exceeded and sends a second instruction to the storage device indicating that activation of the RAID group is necessary and to activate the RAID group, and wherein an activity of the disk group in the plurality of disk groups being controlled dynamically while the storage device is operating;

a third program for causing the computer, when a logical volume is to be mapped to a virtual volume, to select with reference to the management data regarding the at least one storage device, a plurality of candidates indicating a plurality of storage areas, each storage area being included in the at least one storage device and being usable to create the logical volume to be mapped to the virtual volume, while ensuring that the number of active disk groups in each storage device does not exceed the upper limit value;

a fourth program for causing the computer to instruct a particular storage device including a storage area corresponding to one candidate selected from among the plurality of candidates to create a logical volume in the storage area corresponding to the one candidate;

a fifth program for causing the computer to map the logical volume to the virtual volume;

a sixth program for causing the computer to obtain a utilization rate of storage capacity of the virtual volume, and when the utilization rate exceeds a predetermined value, then causing the computer to select the plurality of candidates in order to map a new logical volume to the virtual volume, wherein each of the plurality of candidates is usable without increasing the number of active disk groups beyond the upper limit value and wherein each of the plurality of candidates satisfies a condition preset by a user; and a seventh program for causing the computer:

to activate, responsive to an access request requesting an access to a logical volume in the storage device, a particular disk group to which the requested logical volume belongs in a case where the particular disk group is not active and the particular disk group is capable of being activated without increasing the number of active disk groups beyond the upper limit value, and to postpone, responsive to the access request, the activating of the particular disk group in a case where the particular disk group is not active and the particular disk group is not capable of being activated without increasing the number of active disk groups beyond the upper limit value.

* * * * *